United States Patent
Asakura

(10) Patent No.: US 10,582,547 B2
(45) Date of Patent: Mar. 3, 2020

(54) COMMUNICATION APPARATUS THAT REGISTERS ACCESS POINT INFORMATION RECEIVED FROM TERMINAL DEVICE

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 58 days.

(21) Appl. No.: 15/229,471

(22) Filed: Aug. 5, 2016

(65) Prior Publication Data

US 2017/0041966 A1    Feb. 9, 2017

(30) Foreign Application Priority Data

Aug. 5, 2015 (JP) ................................ 2015-155527

(51) Int. Cl.
| | |
|---|---|
| *H04N 1/00* | (2006.01) |
| *H04W 76/10* | (2018.01) |
| *H04W 4/80* | (2018.01) |
| *H04W 84/12* | (2009.01) |

(52) U.S. Cl.
CPC ........ *H04W 76/10* (2018.02); *H04N 1/00103* (2013.01); *H04N 1/00204* (2013.01); *H04W 4/80* (2018.02); *H04N 2201/0094* (2013.01); *H04W 84/12* (2013.01)

(58) Field of Classification Search
CPC ..... H04W 4/80; H04W 88/08; H04N 1/00204
See application file for complete search history.

(56) References Cited

U.S. PATENT DOCUMENTS

| | | |
|---|---|---|
| 9,311,030 B2 | 4/2016 | Asai |
| 9,317,233 B2 | 4/2016 | Asai |
| 2013/0250357 A1 | 9/2013 | Yu |
| 2014/0038519 A1 | 2/2014 | Asakura |
| 2014/0293333 A1 | 10/2014 | Asai |
| 2015/0324156 A1 | 11/2015 | Asai |

(Continued)

FOREIGN PATENT DOCUMENTS

| | | |
|---|---|---|
| JP | 2013-201687 A | 10/2013 |
| JP | 2014-032579 A | 2/2014 |
| JP | 2014-195151 A | 10/2014 |

*Primary Examiner* — Benjamin O Dulaney
(74) *Attorney, Agent, or Firm* — Banner & Witcoff, Ltd.

(57) ABSTRACT

A communication apparatus may include: a first interface; a second interface; an apparatus memory; and an apparatus controller. The apparatus controller performs: in a case where the first interface receives from a first terminal device a first type of signal related to sending of the access point information to the communication apparatus in a state where the access point information is not registered, registering first access point information, the first access point information being received by the first interface from the first terminal device; and in a case where the first interface receives the first type of signal from a second terminal device after the first access point information has been registered, maintaining the registration of the first access point information that has been registered, without registering second access point information, which is registered in the second terminal device, instead of the first access point information.

15 Claims, 10 Drawing Sheets

(56) References Cited

U.S. PATENT DOCUMENTS

| | | | | |
|---|---|---|---|---|
| 2015/0331649 A1* | 11/2015 | Kadota | ................. | G06F 3/1292 |
| | | | | 358/1.13 |
| 2015/0382136 A1* | 12/2015 | Mihira | ................. | H04W 12/06 |
| | | | | 455/41.1 |
| 2016/0162224 A1* | 6/2016 | Sato | .................... | H04M 1/7253 |
| | | | | 358/1.15 |
| 2016/0360349 A1* | 12/2016 | Goto | .................... | H04W 76/18 |
| 2017/0041400 A1* | 2/2017 | Asakura | ................. | H04W 4/80 |
| 2017/0351469 A1* | 12/2017 | Kadota | ................. | G06F 3/1292 |

* cited by examiner (Second Embodiment)

(Third Embodiment)

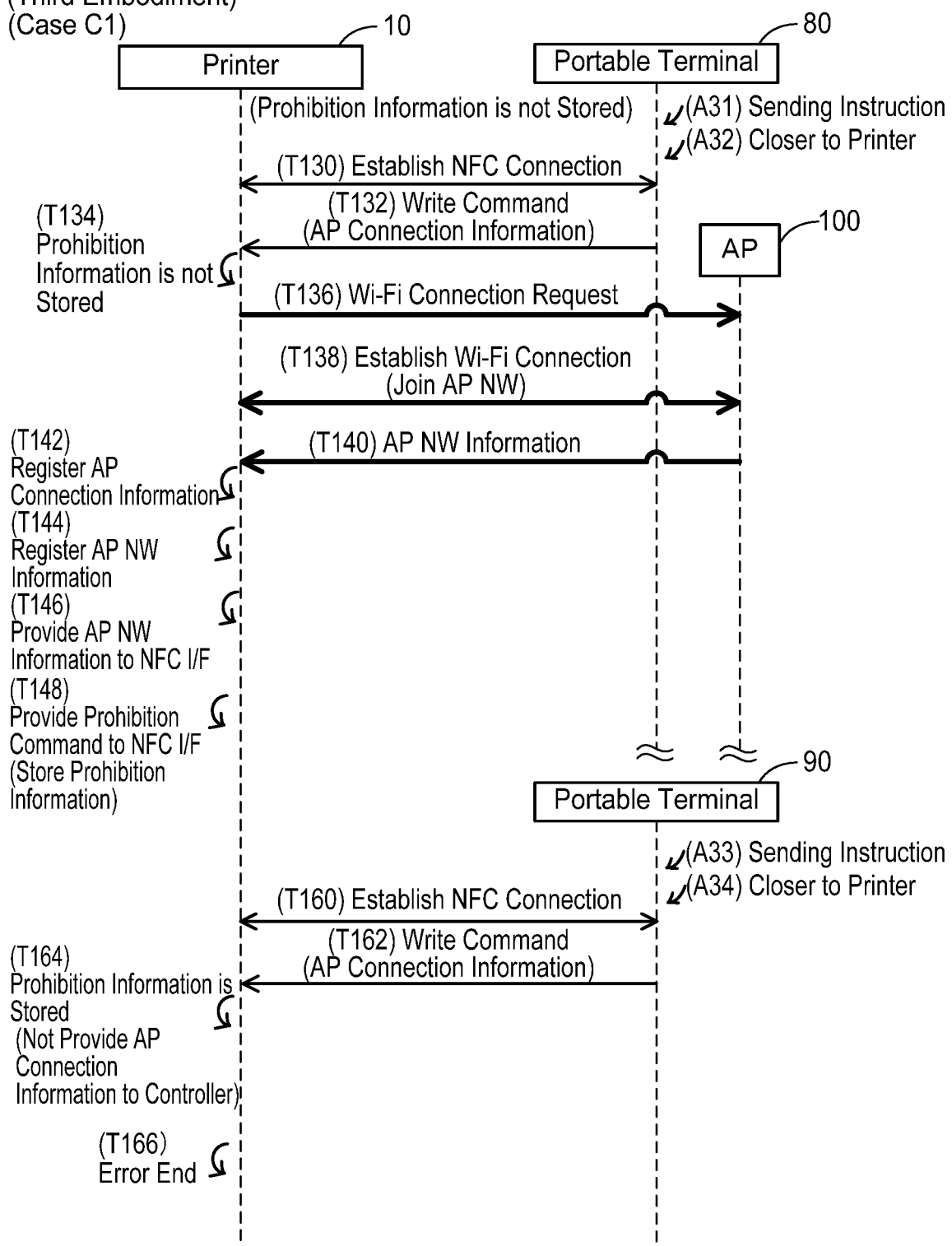

COMMUNICATION APPARATUS THAT REGISTERS ACCESS POINT INFORMATION RECEIVED FROM TERMINAL DEVICE

CROSS-REFERENCE TO RELATED APPLICATION

This application claims priority to Japanese Patent Application No. 2015-155527, filed on Aug. 5, 2015, the entire contents of which are hereby incorporated by reference into the present application.

TECHNICAL FIELD

The technique disclosed in the present specification relates to a communication apparatus capable of establishing a wireless connection with an access point.

DESCRIPTION OF RELATED ART

A conventional printer receives, from an operation terminal, access point information used for a wireless connection with an access point by performing a tag communication, which is a wireless communication between a tag antenna of a wireless tag for a printer, this being provided in the printer, and a first antenna provided in the operation terminal. The printer causes a memory of the printer to store the received access point information, and performs a wireless connection with the access point.

SUMMARY

The above printer receives new access point information from the operation terminal each time a tag communication with the operation terminal is performed, and causese the memory to store the new access point information. That is, in the conventional technique, the access point information in the memory of the printer can change each time the tag communication is performed. Therefore, the access point information can change even in a situation where the printer should not change the access point information in the memory.

In the present specification, a technique is provided capable of suppressing registration of the access point information in a situation where the access point information is not to be registered.

A communication apparatus disclosed in this specification may comprise: a first interface configured to perform a wireless communication in accordance with a first communication scheme; a second interface configured to perform a wireless communication in accordance with a second communication scheme different from the first communication scheme; an apparatus memory comprising a first registration region in which access point information is to be registered, the access point information being for establishing a wireless connection with an access point via the second interface; and an apparatus controller. The apparatus controller is configured to perform: in a case where the first interface receives from a first terminal device a first type of signal related to sending of the access point information to the communication apparatus in a state where the access point information is not registered in the first registration region, registering first access point information in the first registration region, the first access point information being received by the first interface from the first terminal device; and in a case where the first interface receives the first type of signal from a second terminal device after the first access point information has been registered in the first registration region, maintaining the registration of the first access point information that has been registered in the first registration region, without registering second access point information, which is registered in the second terminal device, instead of the first access point information.

Moreover, a control method for implementation of the aforementioned communication apparatus, a computer program, and a computer-readable recording medium which stores the computer program, are also novel and useful.

BRIEF DESCRIPTION OF DRAWINGS

FIG. 10 shows a sequence diagram of the third embodiment.

EMBODIMENT

First Embodiment

Figure 1:
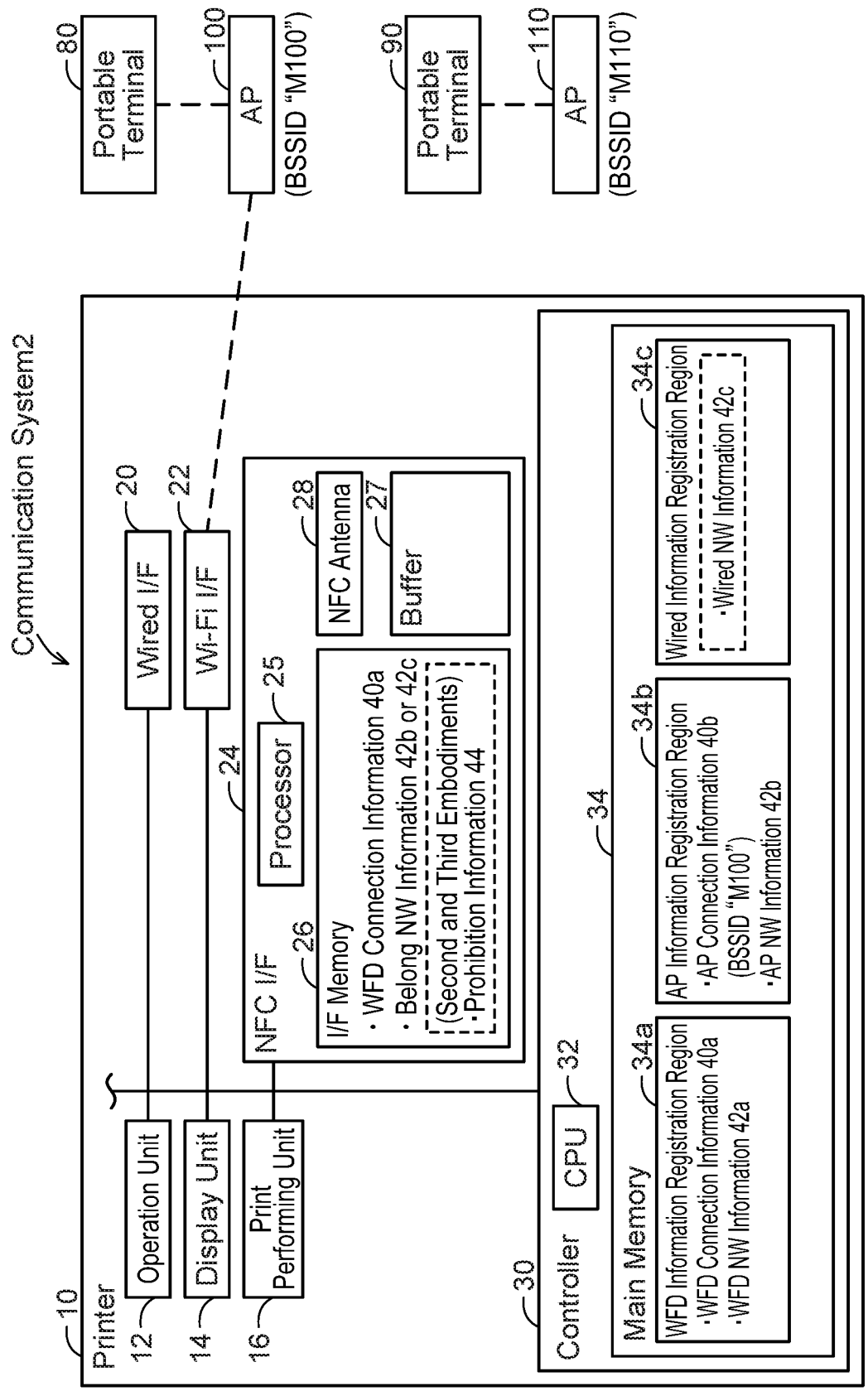
FIG. 1 shows configuration of a communication system.

Configuration of Communication System 2; FIG. 1

A communication system 2 comprises a printer 10, portable terminals 80, 90, and APs (abbreviation of Access Point) 100, 110. The printer 10 and the portable terminals 80, 90 are capable of performing a wireless communication in accordance with the Wi-Fi scheme (called "Wi-Fi communication" below), and a wireless communication in accordance with the NFC (abbreviation of Near Field Communication) scheme (called "NFC communication" below).

(Configuration of Printer 10)

The printer 10 is a peripheral apparatus of a PC (abbreviation of Personal Computer), or the like, and is a peripheral apparatus capable of performing a print function. The printer 10 comprises an operation unit 12, a display unit 14, a print performing unit 16, a wired interface 20, a Wi-Fi interface 22, an NFC interface 24, and a controller 30. The units 12 to 30 are connected to a bus wire (reference number omitted). Below, interface may be described as "I/F".

The operation unit 12 comprises a plurality of keys. A user can input various instructions to the printer 10 by operating the operation unit 12. The display unit 14 is a display for displaying various information. The print performing unit 16 comprises an ink jet method, laser method, etc. printing mechanism.

The wired I/F 20 is an I/F for performing a wired communication. When a communication cable (not shown) is connected with the wired I/F 20, the wired I/F 20 transitions from a link down state to a link up state. On the other hand, when the communication cable is removed from the wired I/F 20, the wired I/F 20 transitions from the link up state to the link down state.

The Wi-Fi I/F 22 is an I/F for performing a wireless communication in accordance with the Wi-Fi scheme. The Wi-Fi scheme is a wireless communication scheme conforming to the standards developed by the Wi-Fi Alliance, and is a wireless communication scheme based on e.g., IEEE (abbreviation of The Institute of Electrical and Electronics Engineers, Inc.) standard 802.11 and standards conforming thereto (e.g., 802.11a, 11b, 11g, 11n, etc.). In particular, the Wi-Fi T/F 22 supports the WFD (abbreviation of Wi-Fi Direct (registered trademark)) scheme developed by the Wi-Fi Alliance.

The NFC T/F 24 is a wireless T/F for performing an NFC communication in accordance with the NFC scheme. The NFC scheme is a wireless communication scheme based on, e.g., international standard IS O/IEC 21481 or 18092.

The NFC I/F 24 comprises a processor 25, an I/F memory 26, a buffer 27, and an NFC antenna 28. The processor 25 is capable of communicating with the controller 30, and performs various processes in accordance with a program (not shown) in the I/F memory 26.

The I/F memory 26 is a non-volatile memory, and is a memory for storing information for sending to an external. WFD connection information 40a and belong network information 42b (or 42c) are stored in the I/F memory 26. Although FIG. 1 illustrates that prohibition information 44 is stored in the I/F memory 26, in the present embodiment, the prohibition information 44 is not stored in the I/F memory 26. Below, network may be referred to as "NW".

The WFD connection information 40a is information for establishing a Wi-Fi connection with the printer 10 which is operating as a parent station (i.e., G/O (Group Owner)) of a WFD NW, and includes various information (i.e., SSID (abbreviation of Service Set Identifier), password, authentication scheme, encryption scheme) used in the WFD NW in which the printer 10 operates as the G/O.

The belong NW information is either the AP NW information 42b or the wired NW information 42c. The AP NW information 42b is information used for performing a Wi-Fi communication with the printer 10 via an AP (e.g., the AP 100), and includes various information (i.e., MAC address, IP address, subnet mask, and UUID (abbreviation of Universary Unique Identifier) of the printer 10) of the printer 10 used in an AP NW formed by the AP.

In a case where the wired I/F 20 is linked up, the wired NW information 42c is stored in the I/F memory 26. The wired NW information 42c is information used for performing a wired communication with the printer 10 via the wired NW, and includes various information (i.e., MAC address, IP address, subnet mask, UUID of the printer 10) of the printer 10 used in the wired NW.

In the example of FIG. 1, the printer 10 has established a Wi-Fi connection with the AP 100. Further, the wired I/F 20 of the printer 10 is not linked up. Therefore, in the example of FIG. 1, the belong NW information being stored in the I/F memory 26 is the AP NW information 42b. Below, the description of the configuration of the printer 10 will continue in accordance with the example of a Wi-Fi connection being established between the printer 10 and the AP 100 (i.e., the example of FIG. 1).

The buffer 27 is a volatile memory, and is a memory for temporarily storing information received from an external via the NFC I/F 24. The NFC antenna 28 is an antenna for receiving or sending various data when performing an NFC communication with another apparatus.

Moreover, an I/F called an NFC forum device, and an I/F called an NFC tag, are known as I/F types for performing an NFC communication. In the present embodiment, the NFC I/F 24 is an NFC tag. The NFC I/F 24, which is an NFC tag, functions as an IC tag of the NFC scheme.

There is a plurality of types of NFC tag, including Type 4 and Type 3. Each type has a different radio wave modulation scheme and communication rules. Specifically, Type 4 is a communication Type defined by the international standard of ISO/IEC 14443, and Type 3 is a communication Type defined by the international standard of ISO/IEC 18092. Differences between Type 4 and Type 3 will be described briefly. For example, in a case where a terminal device is to send either of a Write command or Read command to the Type 4 NFC tag, before sending either command, the terminal device sends a Select Request for confirming an ability of the NFC tag for each command. The terminal device sends the command to be sent when receiving a signal, from the NFC tag, indicating ability to process the command to be sent, and does not send the command to be sent when receiving a signal, from the NFC tag, indicating inability to process the command to be sent. By contrast, in a case where the terminal device is to send commands to the Type 3 NFC tag, the terminal device sends the commands without sending a Select Request. The NFC I/F 24 of the present embodiment is a Type 4 NFC tag.

On the other hand, the NFC forum device is an I/F capable of selectively operating in any mode of P2P (abbreviation of Peer To Peer) mode, R/W (abbreviation of Reader/Writer) mode, and CE (abbreviation of Card Emulation) mode.

Here, differences between the Wi-Fi I/F 22 and the NFC I/F 24 will be described. A communication speed of a wireless communication via the Wi-Fi I/F 22 (e.g., maximum communication speed is 11 to 600 Mbps) is faster than a communication speed of a wireless communication via the NFC I/F 24 (e.g., maximum communication speed is 100 to 424 Kbps). Further, a frequency of a carrier wave (e.g., a 2.4 GHz band or a 5.0 GHz band) upon a wireless communication via the Wi-Fi I/F 22 is different from a frequency of a carrier wave (e.g., a 13.56 MHz band) upon a wireless communication via the NFC I/F 24. Further, a maximum distance of a wireless communication that can be performed via the Wi-Fi I/F 22 (e.g., about 100 m at maximum) is greater than a maximum distance of a wireless communication that can be performed via the NFC I/F 24 (e.g., about 10 cm at maximum).

The controller 30 comprises a CPU 32 and a main memory 34. The CPU 32 is a processor which performs various processes in accordance with a program stored in the main memory 34. The main memory 34 is configured by a RAM, ROM, etc., and stores various information in addition to the aforementioned program. Further, the main memory 34 comprises a WFD information registration region 34a, an AP information registration region 34b, and a wired information registration region 34c.

The WFD information registration region 34a is a region for registration of information related to the WFD NW in which the printer 10 is operating as a parent station (i.e. G/O). Specifically, the WFD connection information 40a and the WFD NW information 42a are registered in the WFD information registration region 34a. The WFD NW information 42a is information used for performing a wireless communication with the printer 10 by using the WFD NW in which the printer 10 is operating as G/O. Specifically, the WFD NW information 42a includes various information (i.e., MAC address, IP address, subnet mask, UUID of the printer 10) of the printer 10 used in the WFD NW in which the printer 10 is operating as G/O.

The AP information registration region 34b is a region for registration of information related to the AP NW formed by the AP 100 with which the printer 10 has established a Wi-Fi connection. Specifically, AP connection information 40b and the AP NW information 42b are registered in the AP information registration region 34b. The AP connection information 40b includes various information (i.e., SSID of the AP NW, password, BSSID of the AP NW (abbreviation of Basic Service Set Identifier. Specifically, a MAC address "M100" of the AP 100)) used for establishing a Wi-Fi connection with the AP 100.

The wired information registration region 34c is a region for registration of the wired NW information 42c. In the example of FIG. 1, the wired I/F 20 has not been linked up, and the wired NW information 42c has not been registered in the wired information registration region 34c. Therefore, in FIG. 1, the wired NW information 42c in the wired information registration region 34c is shown by a broken line.

(Configuration of Portable Terminals 80, 90)

A portable terminal 80 is a portable terminal device such as a mobile telephone (e.g., a smartphone), a PDA, a notebook PC, a tablet PC, a portable music playback device or a mobile movie playback device. The portable terminal 80 comprises a Wi-Fi I/F similar to the Wi-Fi I/F 22 of the printer 10. Further, the portable terminal 80 comprises an NFC I/F. The NFC I/F of the portable terminal 80 is the aforementioned NFC forum device. The NFC I/F of the portable terminal 80 operates in a state in which the R/W mode and P2P mode are activated, and the CE mode is invalidated. The portable terminal 80 further comprises an operation unit, display unit, controller, etc. (not shown). In the example of FIG. 1, the portable terminal 80 has established a Wi-Fi connection with the AP 100. The portable terminal 90 comprises the same configuration as the portable terminal 80. Moreover, the portable terminal 80 has established a Wi-Fi connection with the AP 100, and the portable terminal 90 has established a Wi-Fi connection with the AP 110.

(Configuration of APs 100, 110)

The APs 100, 110 operate as a parent station of a Wi-Fi NW (i.e. the AP NW), forming the AP NW. The printer 10 and the portable terminal 80 belong as child stations (specifically, stations) to the AP NW formed by the AP 100. The AP 100 relays Wi-Fi communication between the printer 10 and the portable terminal 80. The portable terminal 90 belongs as a child station to the AP NW formed by the AP 110. The BSSID (i.e., the MAC address of the AP 100) of the AP NW formed by the AP 100 is "M100". The BSSID (i.e., the MAC address of the AP 110) of the AP NW formed by the AP 110 is "M110".

(Process when Power of Printer 10 Turned ON)

Figure 2:
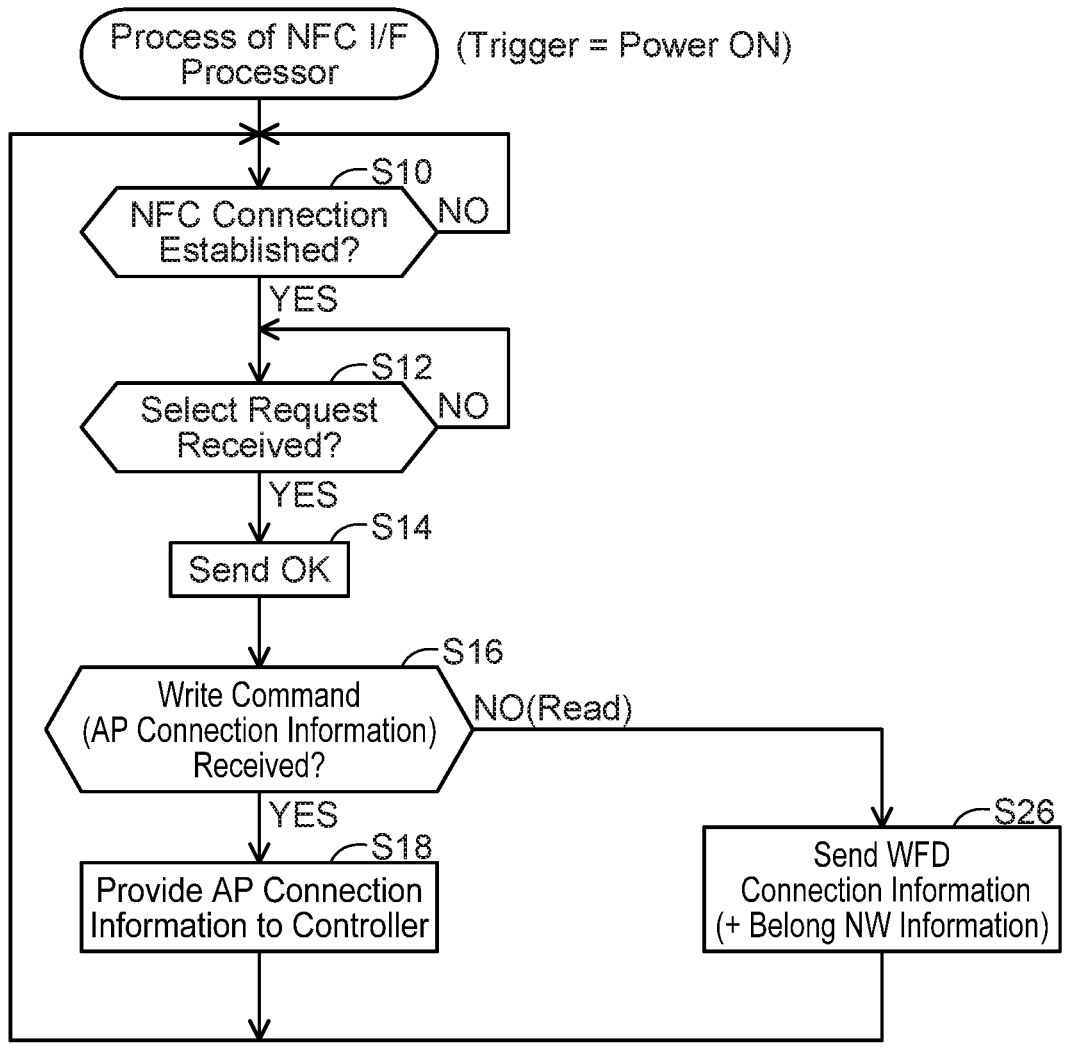
FIG. 2 shows a flowchart of processes of a processor of an NFC interface.
Figure 3:
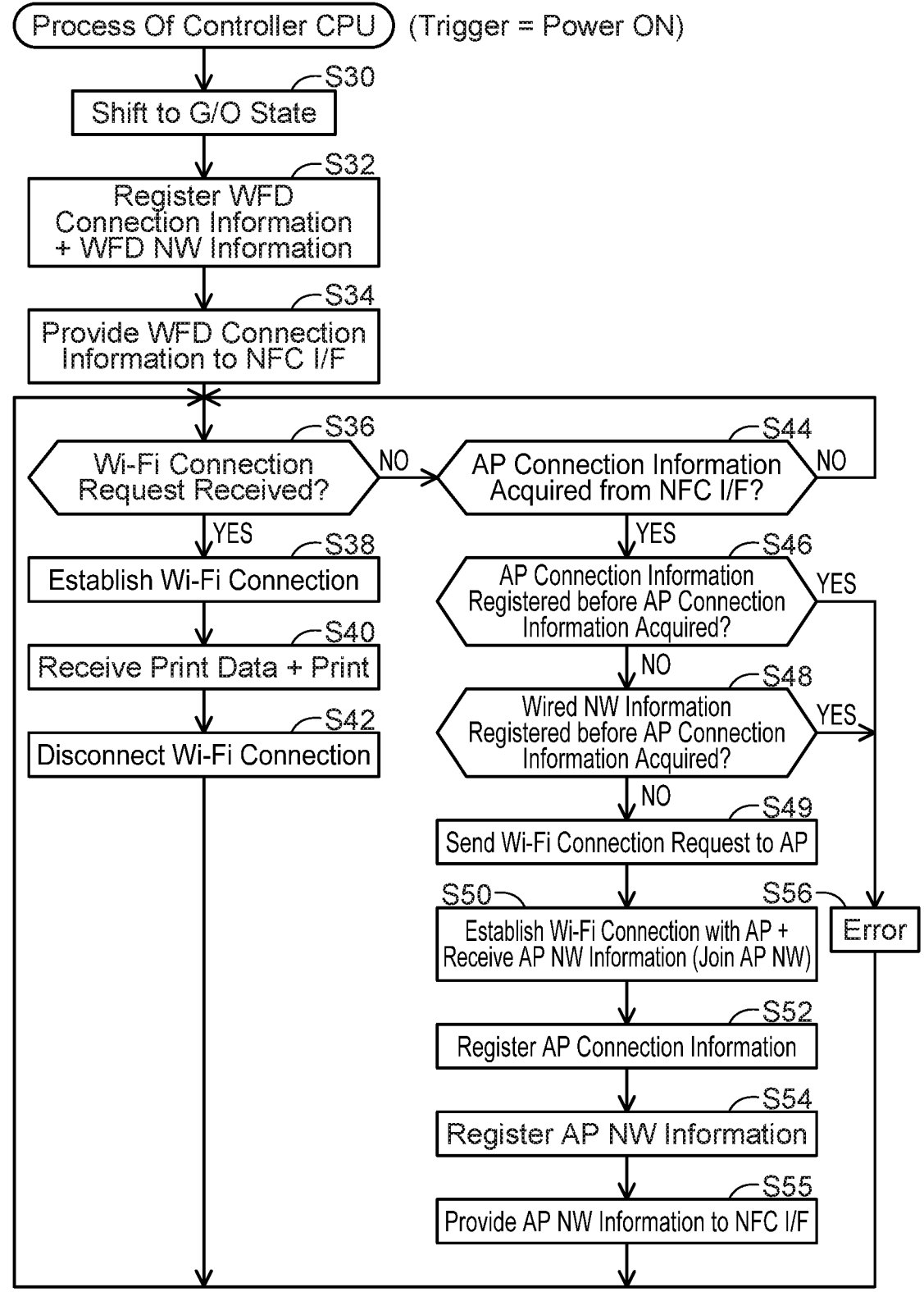
FIG. 3 shows a flowchart of processes of a CPU of a controller.

In a case where the power of the printer 10 is turned ON, the processor 25 of the NFC I/F 24 starts the processes of FIG. 2, and the CPU 32 of the controller 30 starts the processes of FIG. 3. Apart from the processes of FIG. 3, the CPU 32 of the controller 30 further performs a process (not shown) in accordance with a state of the wired I/F 20. This process will be described first before describing the processes of FIG. 2 and FIG. 3.

(Process in Accordance with State of Wired I/F)

Regardless of whether the AP connection information 40b and the AP NW information 42b have been registered in the AP information registration region 34b of the main memory 34, when the wired I/F 20 transitions from the link down state to the link up state, the CPU 32 registers the wired NW information 42c (see FIG. 1) in the wired information registration region 34c of the main memory 34. Further, the CPU 32 provides the wired NW information 42c to the NFC I/F 24. Thereby, the wired NW information 42c is stored as the belong NW information in the I/F memory 26 of the NFC I/F 24. Then, when the wired I/F 20 transitions from the link up state to the link down state, the CPU 32 deletes the wired NW information 42c from the wired information registration region 34c of the main memory 34 and, further, provides a deletion instruction to the NFC I/F 24, deleting the wired NW information 42c from the I/F memory 26.

(Processes of Processor 25 of NFC I/F 24; FIG. 2)

Next, processes performed by the processor 25 of the NFC I/F 24 when the power of the printer 10 is turned ON will be described with reference to FIG. 2. In S10, the processor 25 monitors whether an NFC connection with a portable terminal (e.g., the portable terminal 80) has been established.

In a case where a user of the portable terminal (e.g., the portable terminal 80) wishes to cause the printer 10 to perform a print, the user brings the portable terminal closer to the printer 10 after inputting a predetermined print instruction to the portable terminal. Further, in a case where the user of the portable terminal wishes to cause the printer 10 also to belong to the AP NW to which the portable terminal is belonging, the user brings the portable terminal closer to the printer 10 after inputting, to the portable terminal, a predetermined sending instruction for sending AP connection information to the printer 10. Below, the portable terminal which is brought closer to the printer 10 is called "target terminal". When a distance between the NFC I/F of the target terminal and the NFC I/F 24 of the printer 10 becomes less than a predetermined distance (e.g., 10 cm), an NFC connection is established between these I/Fs. When the NFC connection with the target terminal is established, the processor 25 determines YES in S10, and proceeds to monitoring of S12.

In S12, the processor 25 monitors whether a Select Request has been received from the target terminal. In a case where the user of the target terminal has performed the aforementioned predetermined print instruction or the aforementioned predetermined sending instruction, the target terminal first sends a Select Request to the printer 10. In this case, the processor 25 receives the Select Request from the target terminal, determines YES in S12, and proceeds to S14.

In S14, the processor 25 sends an OK signal to the target terminal indicating that processes can be executed for both the Read command and the Write command. When receiving the OK signal, the target terminal sends the Read command to the printer 10 in a case where the aforementioned print instruction has been input, and sends the Write command including the AP connection information being stored in the target terminal to the printer 10 in a case where the aforementioned predetermined sending instruction has been input.

In S16, the processor 25 monitors whether the Read command requesting sending of the information being stored in the I/F memory 26 of the printer 10 has been received from the target terminal, or whether the Write command including the AP connection information has been received. Here, in a case where the Write command is received, YES is determined in S16, and the processor 25 causes the buffer 27 of the NFC I/F 24 to temporarily store the received AP connection information.

In S18, the processor 25 provides the AP connection information stored in the buffer 27 in S16 to the controller 30 without causing the I/F memory 26 to store therein the AP connection information stored in the buffer 27 in S16. When S18 ends, the process returns to S10.

Unlike the present embodiment, the processor of the NFC I/F may adopt a configuration in which the AP connection information is stored in the I/F memory before being registered in an AP information registration region. In that case, there is a possibility that the AP connection information for registration in the AP information registration region is read out by another terminal device. By contrast, in the present embodiment, as described above, the processor 25 provides the AP connection information for registration in the AP information registration region 34b to the controller 30 without causing the I/F memory 26 to store the AP connection information therein (S18). Therefore, it is possible to suppress the occurrence of the AP connection information for registration in the AP information registration region 34b being read out by another terminal device.

On the other hand, in a case where the Read command is received in S16, the processor 25 determines NO in S16, and proceeds to S26. In S26, the processor 25 reads out the WFD connection information 40a and the belong NW information 42b (or 42c) from the I/F memory 26, and sends this information 40a, 42b (or 42c) to the target terminal. Moreover, when S26 is performed, in a case where the belong NW information 42b (or 42c) is not being stored in the I/F memory 26, the processor 25 sends only the WFD connection information 40a in the I/F memory 26 to the target terminal. When S26 ends, the process returns to S10.

(Processes of CPU 32 of Controller 30; FIG. 3)

Next, the processes of the CPU 32 of the controller 30 will be described with reference to FIG. 3. In S30, the CPU 32 shifts an operating state of the printer 10 from a device state of the WFD scheme to the G/O state. Thereby, the CPU 32 operates as the G/O of the WFD NW, and forms the WFD NW in which the printer 10 operates as the parent station.

Next, in S32, the CPU 32 registers the WFD connection information 40a and the WFD NW information 42a in the WFD information registration region 34a (see FIG. 1). The WFD connection information is prepared as follows. The CPU 32 generates an SSID and password by, e.g., randomly selecting a character string. The CPU 32 prepares this information by acquiring a predetermined authentication scheme and encryption scheme from the main memory 34. The WFD NW information is prepared as follows. The CPU 32 prepares this information by acquiring a predetermined MAC address, subnet mask, and UUID of the printer 10 from the main memory 34. The CPU 32 prepares the IP address of the printer 10 by, e.g., determining one number value from a predetermined number value range.

Next, in S34, the CPU 32 provides the WFD connection information 40a to the NFC I/F 24. Thereby, the WFD connection information 40a is stored in the I/F memory 26. Upon ending S34, the CPU 32 starts the monitoring of S36, S44.

In S36, the CPU 32 monitors whether a Wi-Fi connection request is received from the target terminal via the Wi-Fi I/F 22. In a case of receiving the WFD connection information 40a from the printer 10 (see S26 of FIG. 2), the target terminal can send a Wi-Fi connection request (specifically, a Probe Request) including the SSID in the WFD connection information 40a to the printer 10. When receiving the Wi-Fi connection request from the target terminal, the CPU 32 determines YES in S36, and proceeds to S38.

In S38, the CPU 32 performs a Wi-Fi connection process, and establishes a Wi-Fi connection with the target terminal. Specifically, upon receiving the Wi-Fi connection request (i.e. Probe Request), the CPU 32 sends a response signal (i.e. Probe Response) to the target terminal. Next, the CPU 32 receives an Authentication Request and Association Request from the target terminal, and sends a response signal to the target terminal. Then, the CPU 32 performs a 4-way handshake with the target terminal. When the aforementioned processes end, the Wi-Fi connection with the target terminal is established. The CPU 32 writes the MAC address of the target terminal in an administration list (not shown). Thereby, the CPU 32 can cause the target terminal to join the WFD NW formed in S30 as a child station (i.e. client).

In S40, the CPU 32 receives print data from the target terminal via the Wi-Fi I/F 22 by using the WFD NW, provides the print data to the print performing unit 16, and performs a print in accordance with the print data by causing the print performing unit 16 to perform a print of an image represented by the print data.

In S42, the CPU 32 disconnects the Wi-Fi connection with the target terminal by deleting the MAC address of the target terminal from the administration list. When S42 ends, the process returns to the monitoring of S36 and S44.

As described above, in the present embodiment, since the WFD connection information is stored in the I/F memory 26 after the WFD connection information has been registered in the WFD information registration region 34a, the printer 10 can send the WFD connection information to the target terminal by using the NFC communication (see S26 of FIG. 2). Therefore, the printer 10 can appropriately establish a Wi-Fi connection with the target terminal.

Moreover, in a case where the target terminal has already belonged to the same NW as the printer 10, the CPU 32 does not receive the aforementioned Wi-Fi connection request from the target terminal (NO in S36). Although not shown in FIG. 3, if e.g., the printer 10 has already established a Wi-Fi connection with the AP 100, the target terminal receives both the WFD connection information 40a and the AP NW information 42b from the printer 10 (S26 of FIG. 2). The target terminal attempts a Wi-Fi communication with the printer 10 via the AP 100 by using the information included in the AP NW information 42b. If the communication succeeds, it is confirmed that the target terminal and the printer 10 are belonging to the same AP NW. In that case, the target terminal sends print data to the printer 10 via the AP 100 without sending the aforementioned Wi-Fi connection request to the printer 10. Further, e.g., if the wired I/F 20 of the printer 10 is linked up, the target terminal receives both the WFD connection information 40a and the wired NW information 42c from the printer 10. By performing a Wi-Fi communication via the AP 100 by using the information included in the wired NW information 42c, the target terminal attempts communication with the printer 10 via the wired LAN which might be connected with the AP 100. If the communication succeeds, it is confirmed that the target terminal and the printer 10 are both belonging to the same wired NW. In that case, the target terminal sends print data to the printer 10 by using the wired NW without sending the aforementioned Wi-Fi connection request to the printer 10.

Further, in S44, the CPU 32 monitors whether AP connection information is acquired from the NFC I/F 24. As described above, upon receiving the AP connection information from the target terminal, the processor 25 of the NFC I/F 24 provides the AP connection information to the controller 30 (YES in S16 of FIG. 2, see S18). In this case, the CPU 32 acquires the AP connection information from the NFC I/F 24, determines YES in S44, and proceeds to S46.

In S46, the CPU 32 determines whether the AP connection information 40b (see FIG. 1) has already been registered in the AP information registration region 34b before the AP connection information is acquired (YES in S44). In a case where the AP connection information 40b is already registered in the AP information registration region 34b, the CPU 32 determines YES in S46 and, in S56, performs an error process for causing a predetermined error message to be displayed on the display unit 14. When S56 ends, the process returns to the monitoring of S36 and S44. On the other hand, in a case where the AP connection information 40b has not been registered in the AP information registration region 34b, the CPU 32 determines NO in S46, and proceeds to S48.

In S48, the CPU 32 determines whether the wired NW information 42c (see FIG. 1) has already been registered in the wired information registration region 34c before the AP connection information is acquired (YES in S44). In a case where the wired NW information 42c is already registered in the wired information registration region 34c, the CPU 32 determines YES in S48 and, in S56, performs the error process. On the other hand, in a case where the wired NW information 42c has not been registered in the wired information registration region 34c, the CPU 32 determines NO in S48, and proceeds to S49.

In S49, the CPU 32 sends a Wi-Fi connection request to an AP (e.g., the AP 100) via the Wi-Fi I/F 22. Specifically, the CPU 32 sends a Wi-Fi connection request (Probe Request) including the SSID in the AP connection information acquired in S44 to the AP. Below, the AP using the SSID in the Wi-Fi connection request, i.e., the AP that is a destination of the Wi-Fi connection request, is called "target AP".

In S50, the CPU 32 performs a Wi-Fi connection process, and establishes a Wi-Fi connection with the target AP. Specifically, the CPU 32 sends an Authentication Request and Association Request and, further, performs a 4-way handshake with the target AP. Thereby, the printer 10 can join the AP NW formed by the target AP as a child station. The CPU 32, further, receives the AP NW information from the target AP.

In S52, the CPU 32 registers the AP connection information 40b acquired in S44 in the AP information registration region 34b. In S54, the CPU 32 registers the AP NW information received in S50 in the AP information registration region 34b. In S55, the CPU 32 provides the AP NW information received in S50 to the NFC I/F 24. Thereby, the AP NW information 42b is stored as the belong NW information in the I/F memory 26 of the NFC I/F 24. When S55 ends, the process returns to the monitoring of S36, S44.

As described above, in the present embodiment, in a case where the AP connection information is not registered in the AP information registration region 34b (NO in S46), and the wired I/F 20 is not linked up (NO in S48), the CPU 32 registers the received AP connection information in the AP information registration region 34b (S52). On the other hand, in a case where the AP connection information is not registered in the AP information registration region 34b (NO in S46), and the wired I/F 20 is linked up (YES in S48), the CPU 32 does not register the received AP connection information in the AP information registration region 34b (S56). That is, in the present embodiment, the printer 10 can appropriately switch whether to register the received AP connection information in the AP information registration region 34b in response to whether the wired I/F 20 is linked up. On the other hand, in a case where the printer 10 is configured such that while one of the wired I/F 20 and the Wi-Fi I/F 22 is being used, the other thereof cannot be used, in order to reduce processing load caused by communication, there is a possibility that, while the wired I/F 20 is linked up, the wired NW may be disconnected when allowing the registration of the AP connection information for performing a Wi-Fi connection with the AP. In the present embodiment, it is possible to suppress the occurrence of the aforementioned situation.

(Specific Case)

Next, specific cases A1, A2 realized by the flowcharts of FIG. 2, FIG. 3 will be described with reference to FIG. 4, FIG. 5.

(Case A1; FIG. 4)

Case A1 shows a case in which a Wi-Fi connection between the printer 10 and the AP 100 is established. Moreover, at a start time of case A1, the AP connection information 40b has not been registered in the AP information registration region 34b of the printer 10, and the wired NW information 42c has also not been registered in the wired information registration region 34c (i.e., the wired I/F 20 is not linked up). Further, at the start time of case A1, the portable terminal 80 has established a Wi-Fi connection with the AP 100, and the portable terminal 90 has established a Wi-Fi connection with the AP 110 (see FIG. 1).

In A01, the user of the portable terminal 80 inputs, to the portable terminal 80, the predetermined sending instruction for sending the AP connection information to the printer 10. Next, in A02, the user of the portable terminal 80 brings the portable terminal 80 closer to the printer 10.

In T10, an NFC connection between the NFC I/F of the portable terminal 80 and the NFC I/F 24 of the printer 10 is established (YES in S10 of FIG. 2) by the distance between these I/Fs becoming less than a predetermined distance (e.g., 10 cm).

In T12, the printer 10 receives a Select Request from the portable terminal 80 (YES in S12) and, in T14, sends an OK signal to the portable terminal 80 (S14). Next, in T16, the printer 10 receives the Write command including the AP connection information from the portable terminal 80 (YES in S16) and, in T18, determines that the AP connection information is not registered in the AP information registration region 34b (NO in S46, S48 of FIG. 3).

Next, in T20 the printer 10 sends a Wi-Fi connection request to the AP 100 (S49) and, in T22, establishes a Wi-Fi connection with the AP 100 (S50). Thereby, the printer 10 joins the AP NW formed by the AP 100. Next, in T24 the printer 10 receives the AP NW information from the AP 100 and, in T26 and T28, registers the AP connection information and the AP NW information in the AP information registration region 34b (S52, S54). Next, in T29, the printer 10 provides the AP NW information to the NFC I/F 24 (S55). Thereby, the AP NW information (see reference number 42b of FIG. 1) is stored in the I/F memory 26 of the printer 10.

Then, in A03, the user of the portable terminal 90 inputs a sending instruction to the portable terminal 90. Next, in A04, the user of the portable terminal 90 brings the portable terminal 90 closer to the printer 10.

In T30, an NFC connection between the NFC I/F of the portable terminal 90 and the NFC I/F 24 of the printer 10 (YES in S10 of FIG. 2) is established by the distance between these I/Fs becoming less than the predetermined distance.

In T32, the printer 10 receives a Select Request from the portable terminal 90 (YES in S12) and, in T34, sends an OK signal to the portable terminal 90 (S14). Next, in T36, the printer 10 receives the Write command including the AP connection information from the portable terminal 90 (YES in S16) and, in T38, determines that the AP connection information is already registered in the AP information registration region 34b (YES in S46 of FIG. 3). In T40, the printer 10 does not newly register (i.e. overwrite) the AP connection information received from the portable terminal 90 instead of the AP connection information already registered in the AP information registration region 34b. Next, as shown in T42, the printer 10 also does not send a Wi-Fi connection request to the AP 110. In T44, the printer 10 ends the Wi-Fi setting process (S56) in error.

(Case A2; FIG. 5)

Case A2 shows a case in which the printer 10 receives print data from the portable terminal 80 and performs a print. Moreover, case A2 of FIG. 5 is a case after the ending of case A1. That is, at a start time of case A2, the printer 10 has established a Wi-Fi connection with the AP 100.

In A11, the user of the portable terminal 80 inputs a predetermined print instruction to the portable terminal 80. Next, in A12, the user of the portable terminal 80 brings the portable terminal 80 closer to the printer 10.

In T50, an NFC connection between the NFC I/F of the portable terminal 80 and the NFC I/F 24 of the printer 10 is established (YES in S10 of FIG. 2).

In T52, the printer 10 receives a Select Request (YES in S12) and, in T54, sends an OK signal to the portable terminal 80 (S14). Next, in T56, the printer 10 receives from the portable terminal 80 a Read command for requesting sending of the information in the I/F memory 26 (NO in S16) and, in T58, sends the WFD connection information and the AP NW information being stored in the I/F memory 26 to the portable terminal 80.

Upon receiving the WFD connection information and the AP NW information (T58), the portable terminal 80 attempts a Wi-Fi communication with the printer 10 via the AP 100 by using the received AP NW information. In this case, the Wi-Fi communication succeeds. Therefore, the portable terminal 80 can confirm that both the portable terminal 80 and the printer 10 belong to the AP NW formed by the AP 100.

In T60, T62, the printer 10 receives print data from the portable terminal 80 via the AP 100. In this case, the printer 10 does not receive a Wi-Fi connection request including the WFD connection information from the portable terminal 80. In T64, the printer 10 performs a print in accordance with the received print data.

Then, in A13, the user of the portable terminal 90 inputs a print instruction to the portable terminal 90. Next, in A14, the user of the portable terminal 90 brings the portable terminal 90 closer to the printer 10.

Then, the printer 10 performs, with the portable terminal 90, the same processes as T50 to T58 described above.

Upon receiving the WFD connection information and the AP NW information (T58), the portable terminal 90 attempts a Wi-Fi communication with the printer 10 via the AP 110 by using the received AP NW information. In this case, the Wi-Fi communication fails. Therefore, the portable terminal 90 can confirm that the portable terminal 90 and the printer 10 are not both belonging to a common AP NW.

In T70, the printer 10 receives a Wi-Fi connection request including the SSID in the WFD connection information from the portable terminal 90 (YES in S36 of FIG. 3) and, in T72, establishes a Wi-Fi connection with the portable terminal 90 (S38). Next, upon receiving print data from the portable terminal 90 in T74, in T76 the printer 10 performs a print in accordance with the received print data (S40).

Next, in T78, the printer 10 disconnects the Wi-Fi connection with the portable terminal 90 (S42).

Advantage of Present Embodiment

Figure 4:
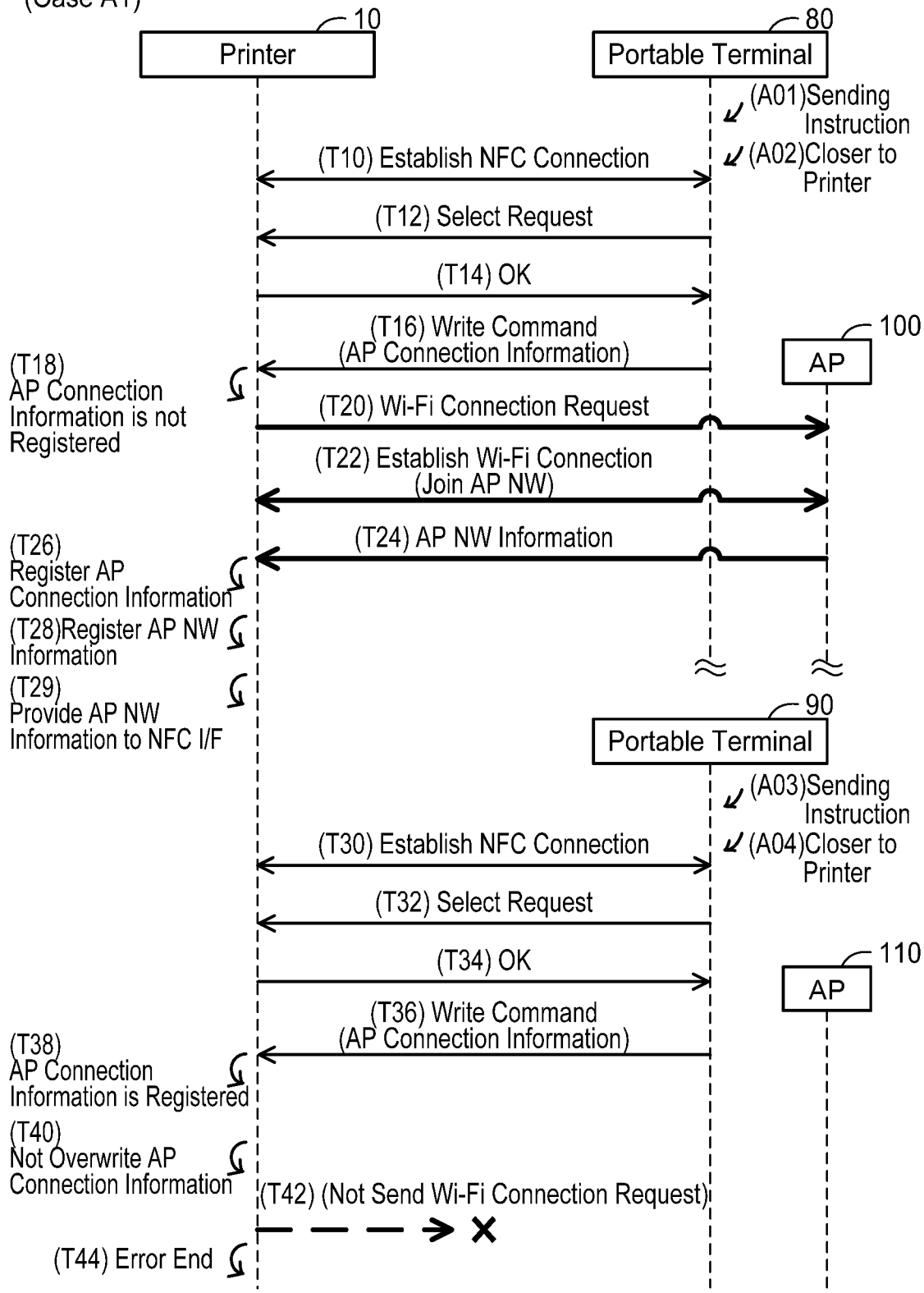
FIG. 4 shows a sequence diagram of a case A1 in which a Wi-Fi connection is established between a printer and an access point.

In the present embodiment, as shown in the example of FIG. 4, upon receiving the AP connection information from the portable terminal 80, the printer 10 can establish a Wi-Fi connection with the AP 100 by using the AP connection information (T22). Then, after the AP connection information received from the portable terminal 80 has been registered in the AP information registration region 34b, even if a Write command including other AP connection information is received from the portable terminal 90, the printer 10 maintains the registration of the AP connection information already registered in the AP information registration region 34b without newly registering (i.e. overwriting) (T40) the AP connection information received from the portable terminal 90 instead of the AP connection information already registered in the AP information registration region 34b. Therefore, in the present embodiment, it is possible to prevent the registration of the AP connection information in a situation where the AP connection information is not to be registered. Moreover, the printer 10 not registering the new AP connection information instead of the AP connection information already registered in the AP information registration region 34b can also be said to be the printer 10 prohibiting registration of the new AP connection information.

Figure 5:
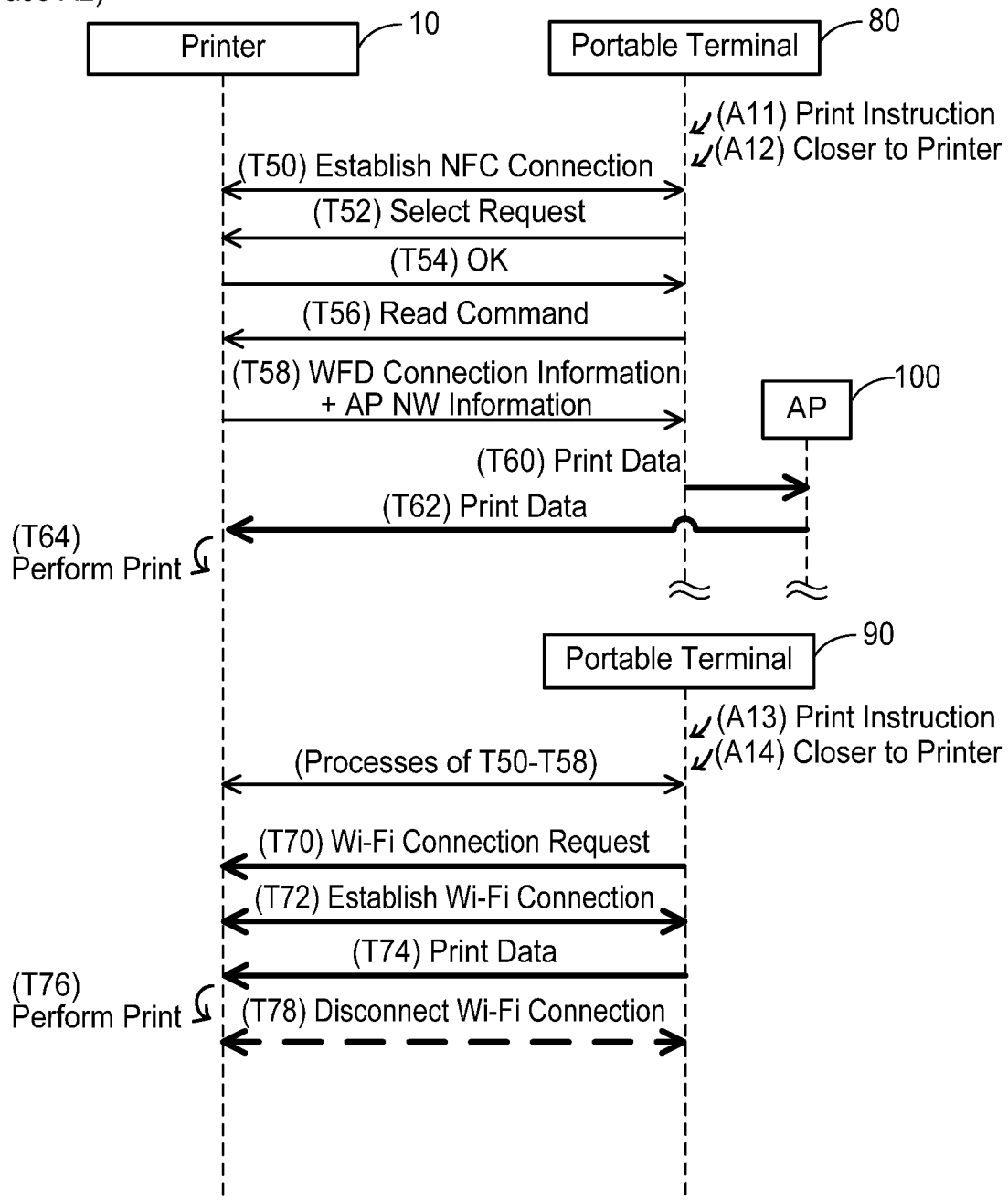
FIG. 5 shows a sequence diagram of a case A2 in which the printer performs a print.

Further, in the present embodiment, as shown in the example of FIG. 5, after the Wi-Fi connection with the AP 100 has been established, the printer 10 can send the belong NW information to the portable terminal 80 (90) in addition to the WFD connection information (T58). By attempting a Wi-Fi communication with the printer 10 using the AP NW information, the portable terminal 80 (90) which has received the AP NW information can confirm whether the portable terminal 80 (90) is belonging to the AP NW formed by the AP 100, in the same manner as the printer 10. In the example of FIG. 5, it is possible to confirm that the portable terminal 80 is belonging to the AP NW formed by the AP 100. Therefore, the printer 10 and the portable terminal 80 do not need to establish a Wi-Fi connection by using the WFD connection information.

(Correspondence Relationship)

The printer 10, the portable terminal 80, and the portable terminal 90 are examples of "communication apparatus", "first terminal device", "second terminal device", respectively. Further, the NFC I/F 24, the Wi-Fi I/F 22, and the wired I/F 20 are examples of "first interface", "second interface", "third interface", respectively. The NFC scheme is an example of "first communication scheme". The Wi-Fi scheme is an example of "second communication scheme". The controller 30, the main memory 34, the AP information registration region 34b, and the WFD information registration region 34a are examples of "apparatus controller", "apparatus memory", "first registration region", and "second registration region", respectively. The processor 25, the I/F memory 26, and the buffer 27 are examples of "interface controller", "first interface memory", and "second interface memory", respectively. The AP connection information received from the portable terminal 80, and the AP connection information received from the portable terminal 90, of FIG. 4, are examples of "first access point information" and "second access point information", respectively. The WFD connection information 40a is an example of "parent station information". The AP NW information 42b is an example of "wireless communication information". The portable terminals 80, 90 of the example of FIG. 5 are an example of "third terminal device". The Write command is an example of "first type of signal". The Read command is an example of "third type of signal".

S52, S56 of FIG. 3 are examples of processes of "registering . . . " and "maintaining . . . ". S32 is an example of a process of "causing the second registration region to store the parent station information . . . ". S34 is an example of a process of "causing the interface memory to store the parent station information . . . ". S49, S50 are examples of processes of "establishing . . . ". S55 is an example of a process of "causing the interface memory to store the wireless communication information . . . ".

S16 of FIG. 2 is an example of processes of "receiving the first type of signal including the first access point information . . . ", and "receiving the first type of signal including the second access point information . . . ". S18 is an example of processes of "providing the first access point information in the first type of signal . . . ", "providing the second access point information in the first type of signal . . . ", and "providing the first access point information, received from the first terminal device and stored in the second interface memory, to the apparatus controller . . . ". S24 is an example of a process of "receiving, from a third terminal device, a third type of signal . . . ". S26 is an example of a process of "sending the parent station information to the third terminal device . . . ".

Second Embodiment

A second embodiment is described focusing on differences from the first embodiment. The present embodiment, as shown in FIG. 1, differs from the first embodiment in that the prohibition information 44 is further being stored in the I/F memory 26. The prohibition information 44 is information for prohibiting provision of information to the controller 30 from the NFC I/F 24. Further, a part of the contents of the processes performed by the processor 25 of the NFC I/F 24 (FIG. 6), and of the processes performed by the CPU 32 of the controller 30 (FIG. 7) is different from the first embodiment. This will be described below.

Figure 6:
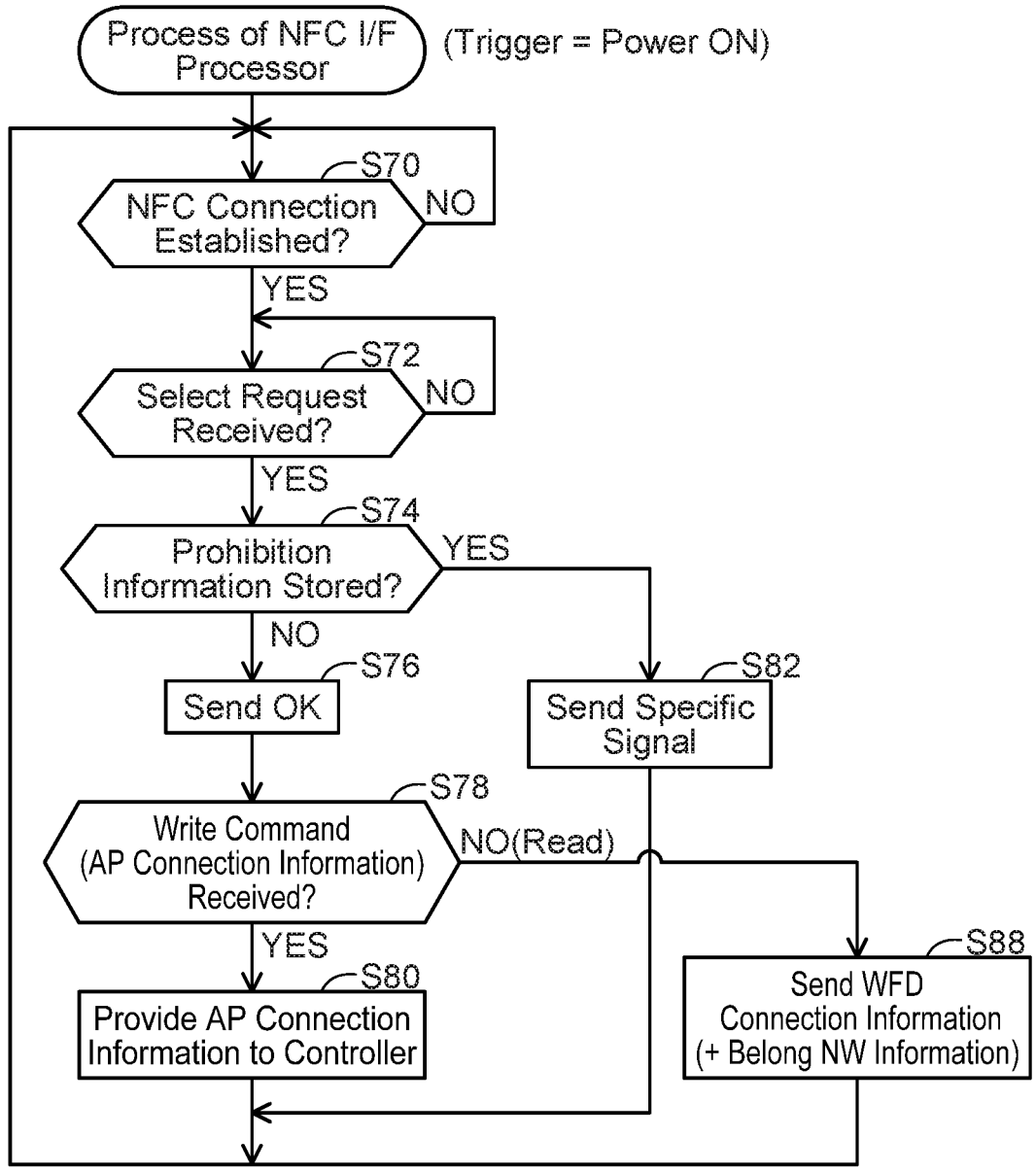
FIG. 6 shows a flowchart of processes of a processor of an NFC interface of a second embodiment.

(Process of Processor 25 of NFC I/F 24; FIG. 6)
A process performed by the processor 25 will be described with reference to FIG. 6. In S70, the processor 25 monitors whether an NFC connection with the target terminal is established. The contents of S70 are the same as S10 of FIG. 2. In a case of YES in S70, the processor 25 performs monitoring of S72. S72 is the same as S12 of FIG. 2. In a case of YES in S72, the process proceeds to S74.

In S74, the processor 25 determines whether the prohibition information 44 (see FIG. 1) is being stored in the I/F memory 26. In a case where the prohibition information 44 is already being stored in the I/F memory 26, the processor 25 determines YES in S74, and proceeds to S82. In S82, the processor 25 sends to the target terminal a specific signal indicating ability to perform processing for the Read command, and inability to perform processing for the Write command. When S82 ends, the process returns to S70. On the other hand, in a case where the prohibition information 44 is not being stored in the I/F memory 26, the processor 25 determines NO in S74, and proceeds to S76.

In S76, the processor 25 sends an OK signal to the target terminal. S78, S80, S88, which are subsequent, are respectively the same as S16, S18, S26 of FIG. 2. When S80 or S88 ends, the process returns to S70.

Figure 7:
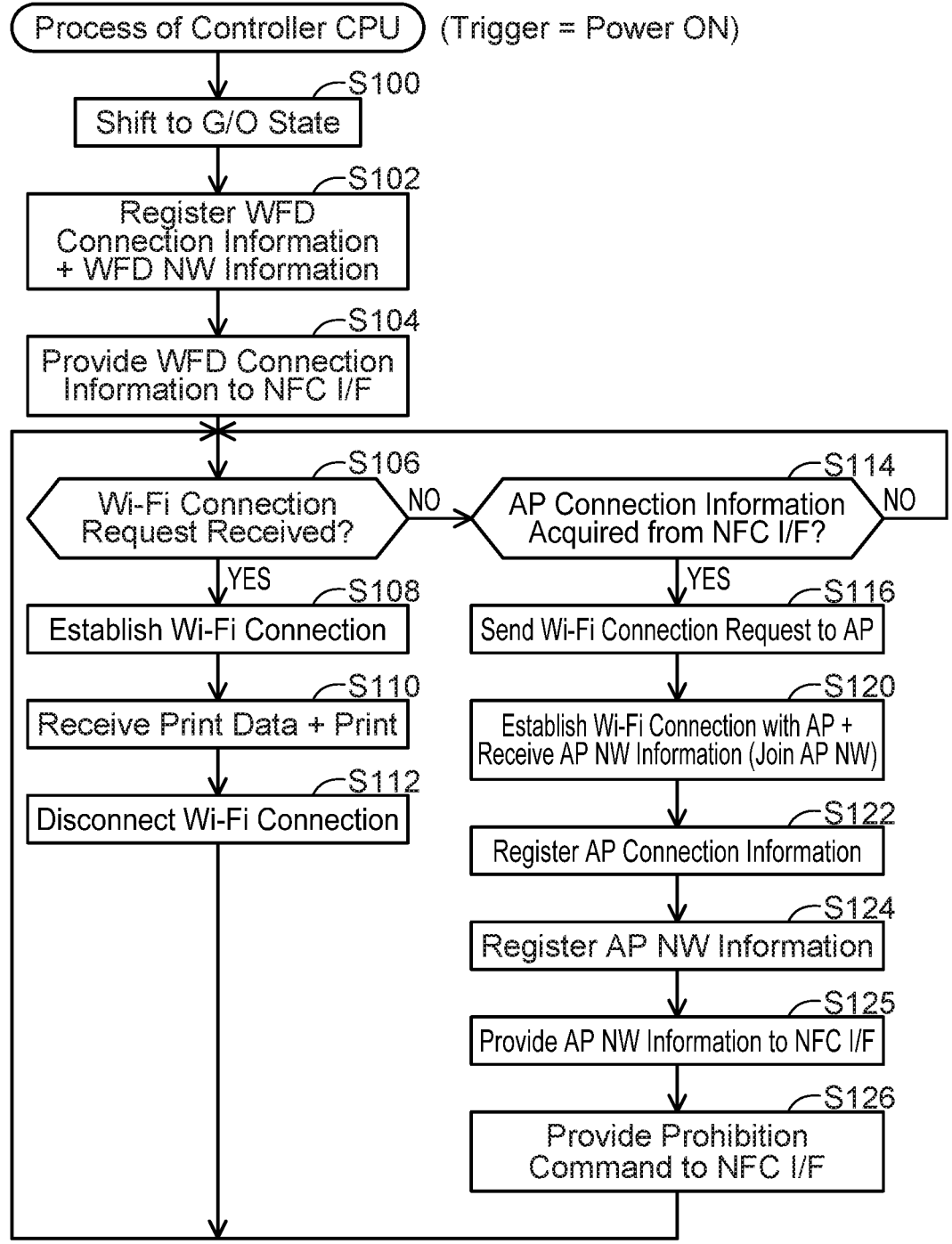
FIG. 7 shows a flowchart of processes of a CPU of a controller of second and third embodiments.

(Process of CPU 32 of Controller 30; FIG. 7)
Next, a process of the CPU 32 of the controller 30 will be described with reference to FIG. 7. S100, S102, S104 are respectively the same as S30, S32, S34 of FIG. 3. Upon ending S104, the processor 25 performs monitoring of S106, S114. S106, S114 are respectively the same as S36, S44 of FIG. 3. In a case of YES in S106, the process proceeds to S108, and in a case of YES in S114, the process proceeds to S116.

S108, S110, S112 are respectively the same as S38, S40, S42 of FIG. 3. When S112 ends, the process returns to the monitoring of S106, S114.

S116, S120, S122, S124, S125 are respectively the same as S49, S50, S52, S54, S55 of FIG. 3. In the present embodiment, when S125 ends, the process proceeds to S126.

In S126, the CPU 32 provides a prohibition command to the NFC I/F 24. Upon acquiring the prohibition command from the controller 30, the processor 25 of the NFC I/F 24 causes the I/F memory 26 to store prohibition information. When S126 ends, the process returns to the monitoring of S106, S114.

Figure 8:
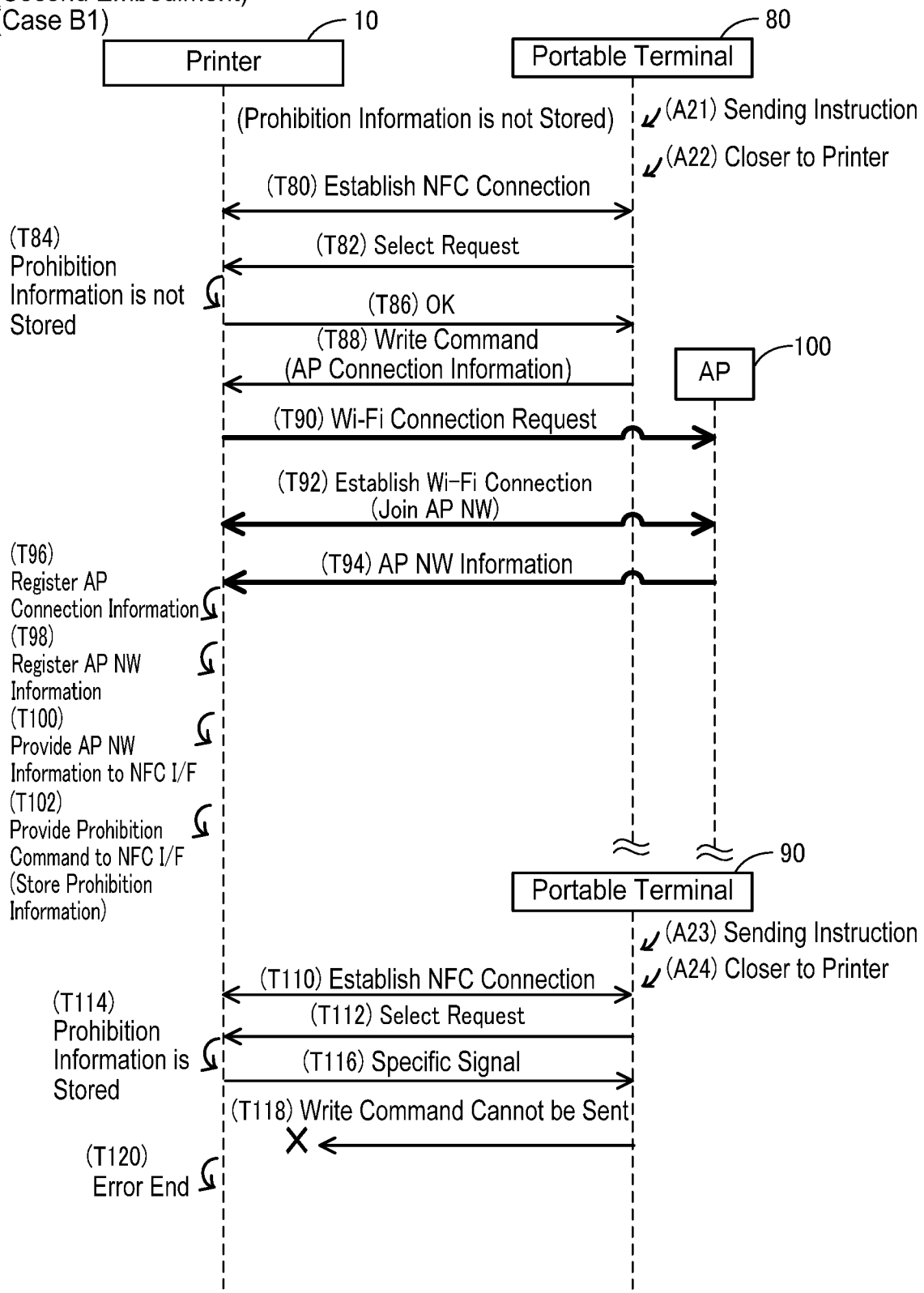
FIG. 8 shows a sequence diagram of the second embodiment.

(Specific Case (Case B1); FIG. 8)
Next, a specific case B1 realized by the flowcharts of FIG. 6 and FIG. 7 will be described with reference to FIG. 8. Case B1 shows a case in which a Wi-Fi connection between the printer 10 and the AP 100 is established. Moreover, a case B2 (not shown) in which the printer 10 receives print data from the portable terminal 80 and performs a print, is the same as case A2 of FIG. 5, and a description thereof is therefore omitted.

Moreover, at the start time of case B1 also, as with the start time of case A1 (FIG. 4), the AP connection information 40*b* has not been registered in the AP information registration region 34*b* of the printer 10, and the wired NW information 42*c* has also not been registered in the wired information registration region 34*c* (i.e., the wired I/F 20 is not linked up). That is, the prohibition information is not being stored in the I/F memory 26.

In A21, the user of the portable terminal 80 inputs the predetermined sending instruction to the portable terminal 80. Next, in A22, the user of the portable terminal 80 brings the portable terminal 80 closer to the printer 10.

In T80, an NFC connection between the NFC I/F of the portable terminal 80 and the NFC I/F 24 of the printer 10 is established by the distance between these I/Fs becoming less than the predetermined distance (YES in S70 of FIG. 6).

In T82, upon receiving a Select Request from the portable terminal 80 (YES in S72), in T84 the printer 10 determines that the prohibition information is not being stored in the I/F memory 26 (NO in S74). Next, in T86, the printer 10 sends an OK signal to the portable terminal 80 (S76). Next, in T88, the printer 10 receives the Write command including the AP connection information from the portable terminal 80 (YES in S78) and, in T90, sends a Wi-Fi connection request to the AP 100 (S116 of FIG. 7).

Next, in T92, the printer 10 establishes a Wi-Fi connection with the AP 100 (S120). Thereby, the printer 10 joins the AP NW formed by the AP 100. Next, in T94, the printer 10 receives the AP NW information from the AP 100 and, in T96 and T98, registers the AP connection information and the AP NW information in the AP information registration region 34*b* (S122, S124). Next, in T100, the printer 10 provides the AP NW information to the NFC I/F 24 (S125). Thereby, the AP NW information 42*b* (see FIG. 1) is stored in the I/F memory 26 of the printer 10. Further, in T102, the printer 10 provides a prohibition command to the NFC I/F

24 (S126). Thereby, the prohibition information 44 (see FIG. 1) is stored in the I/F memory 26 of the printer 10.

Then, in A23, the user of the portable terminal 90 inputs a sending instruction to the portable terminal 90. Next, in A24, the user of the portable terminal 90 brings the portable terminal 90 closer to the printer 10.

In T110, an NFC connection between the NFC I/F of the portable terminal 90 and the NFC I/F 24 of the printer 10 is established by the distance between these I/Fs becoming less than the predetermined distance (YES in S70 of FIG. 6).

In T112, the printer 10 receives a Select Request from the portable terminal 90 (YES in S72) and, in T114, determines that the prohibition information 44 is being stored in the I/F memory 26 (YES in S74). Next, in T116, the printer 10 sends the specific signal to the portable terminal 90 (S82).

In this case, the printer 10 does not receive the Write command including the AP connection information from the portable terminal 90 (T118). In T120, the printer 10 ends the Wi-Fi setting process in error.

Advantage of Present Embodiment

As described above, in the present embodiment, the processor 25 does not receive the Write command from the target terminal after the prohibition information 44 has been stored in the I/F memory 26 (see S74 to S82 of FIG. 6). That is, the processor 25 does not receive new AP connection information from the target terminal after the prohibition information 44 has been stored in the I/F memory 26. Therefore, in the present embodiment, the printer 10 can appropriately prevent the AP connection information registered in the AP information registration region 34b from being replaced with new AP connection information after the prohibition information has been stored in the I/F memory 26. Moreover, the action of not receiving new AP connection information by not receiving the Write command from the target terminal due to the prohibition information 44 being stored in the I/F memory 26, can also be said to be prohibiting registration of the new AP connection information.

(Correspondence Relationship)

The Select Request and the Write command are examples of "first type of signal" and "second type of signal", respectively. The OK signal and the specific signal are examples of "first response signal" and "second response signal", respectively. S126 of FIG. 7 is an example of a process of "causing the interface memory to store prohibition information . . . ". The process in case of YES in S72 of FIG. 6 is an example of processes of "receiving the first type of signal including the first access point information . . . ", and "receiving the second type of signal including the first access point information . . . ". S76 is an example of a process of "sending a first response signal to the first terminal device . . . " is performed. S78 is an example of a process of "receiving the first type of signal including the second access point information". S80 is an example of a process of "providing the first access point information in the second type of signal to the apparatus controller . . . ". S82 is an example of a process of "sending a second response signal . . . ".

Third Embodiment

A third embodiment is a modification of the second embodiment. Therefore, the description will focus on differences from the first and second embodiments. In the present embodiment, the NFC I/F 24 differs from the first and second embodiments in the point of being a Type 3 NFC tag. In the present embodiment, also, as in the second embodiment, the prohibition information 44 is stored in the I/F memory 26. In the present embodiment, a part of the processes performed by the processor 25 of the NFC I/F 24 (FIG. 9) is different from the second embodiment. Moreover, the contents of the processes performed by the CPU 32 of the controller 30 are substantially the same as the second embodiment (FIG. 7), and consequently a description thereof is omitted.

Figure 9:
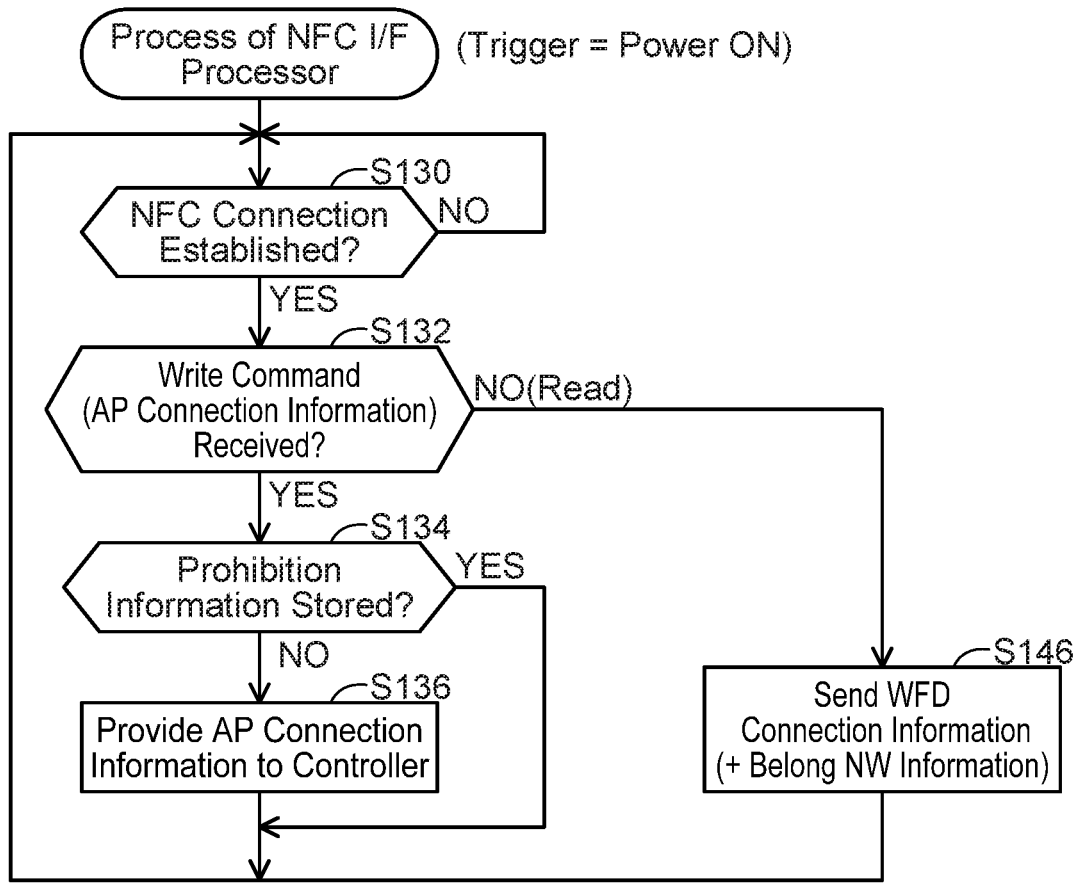
FIG. 9 shows a flowchart of processes of a processor of an NFC interface of the third embodiment.

(Processes of Processor 25 of NFC I/F 24; FIG. 9)

Processes of the processor 25 of the present embodiment will be described with reference to FIG. 9. In S130, the processor 25 monitors whether an NFC connection is established with the target terminal. The contents of S130 are also the same as S10 of FIG. 2. In case of YES in S130, the processor 25 performs monitoring of S132. That is, the processor 25 monitors whether either of the Write command including the AP connection information, or the Read command, has been received from the target terminal.

As described above, the NFC I/F 24 of the present embodiment is a Type 3 NFC tag. Therefore, in a case where the user of the target terminal has performed the sending instruction described above, the target terminal sends the Write command including the AP connection information to the printer 10 without sending the Select Request to the printer 10. In this case, the processor 25 receives the Write command including the AP connection information from the target terminal, determines YES in S132, and proceeds to S134.

On the other hand, in a case where the user of the target terminal has performed the print instruction described above, the target terminal sends the Read command to the printer 10 without sending the Select Request to the printer 10. In this case, the processor 25 receives the Read command from the target terminal, determines NO in S132, and proceeds to S146.

In S134, the processor 25 determines whether the prohibition information is being stored in the I/F memory 26. In a case where the prohibition information 44 is already being stored in the I/F memory 26, the processor 25 determines YES in S134. In case of YES in S134, the processor 25 returns to the process of S130 without providing the AP connection information to the controller 30. On the other hand, in a case where the prohibition information is not being stored in the I/F memory 26, the processor 25 determines NO in S134, and proceeds to S136.

In S136, the processor 25 provides the received AP connection information to the controller 30. When S136 ends, the process returns to the monitoring of S130.

On the other hand, in S146, the processor 25 sends the WFD connection information 40a and the belong NW information 42b (or 42c) being stored in the I/F memory 26 to the target terminal. Since the contents of S146 are the same as S26 of FIG. 2, a detailed description thereof is omitted. When S146 ends, the process returns to the monitoring of S130.

(Specific Case (Case C1); FIG. 10)

Next, a specific case C1 realized by the flowcharts of FIG. 9 and FIG. 7 will be described with reference to FIG. 10. Case C1 also shows a case in which a Wi-Fi connection between the printer 10 and the AP 100 is established. Moreover, a case C2 (not shown) in which the printer 10 receives print data from the portable terminal 80 and performs a print is the same as case A2 of FIG. 5, and consequently a detailed description thereof is omitted.

Moreover, at the start time of case C1, also, as with the start time of case A1 (FIG. 4), the AP connection information 40b has not been registered in the AP information registration region 34b of the printer 10, and the wired NW information 42c has also not been registered in the wired information registration region 34c (i.e., the wired I/F 20 is not linked up). That is, the prohibition information is not being stored in the I/F memory 26.

In A31, the user of the portable terminal 80 inputs the predetermined sending instruction to the portable terminal 80. Next, in A32, the user of the portable terminal 80 brings the portable terminal 80 closer to the printer 10.

In T130, an NFC connection between the NFC I/F of the portable terminal 80 and the NFC I/F 24 of the printer 10 is established by the distance between these I/Fs becoming less than the predetermined distance (YES in S130 of FIG. 9).

Upon receiving the Write command including the AP connection information from the portable terminal 80 in T132 (YES in S132), in T134 the printer 10 determines that the prohibition information is not being stored in the I/F memory 26 (NO in S134). Next, in T136, the printer 10 sends a Wi-Fi connection request to the AP 100 (S116 of FIG. 7) and, in T138, establishes a Wi-Fi connection with the AP 100 (S120). Thereby, the printer 10 joins the AP NW formed by the AP 100. Next, in T140, the printer 10 receives the AP NW information from the AP 100. Then, in T142, T144, the printer 10 registers the AP connection information and the AP NW information in the AP information registration region 34b (S122, S124). Next, in T146, the printer 10 provides the AP NW information to the NFC I/F 24 (S125). Thereby, the AP NW information 42b (see FIG. 1) is stored in the I/F memory 26 of the printer 10. Further, in T148, the printer 10 provides the prohibition command to the NFC I/F 24 (S126). Thereby, the prohibition information 44 (see FIG. 1) is stored in the I/F memory 26 of the printer 10.

Then, in A33, the user of the portable terminal 90 inputs the sending instruction to the portable terminal 90. Next, in A24, the user of the portable terminal 90 brings the portable terminal 90 closer to the printer 10.

In T160, an NFC connection between the NFC I/F of the portable terminal 90 and the NFC I/F 24 of the printer 10 is established by the distance between these I/Fs becoming less than the predetermined distance (YES in S130 of FIG. 9).

In T162, the printer 10 receives the Write command including the AP connection information (T162) from the portable terminal 90 (YES in S132) and, in T164, determines that the prohibition information 44 is already being stored in the I/F memory 26 (YES in S134). In this case, the processor 25 does not send the AP connection information to the controller 30. In T166, the printer 10 ends the Wi-Fi connection process in error.

Advantage of Present Embodiment

As described above, in the present embodiment, after the prohibition information 44 has been stored in the I/F memory 26, even in a case of receiving the Write command including the AP connection information from the target terminal, the processor 25 does not provide the received AP connection information to the controller 30 (see S132 to S136 of FIG. 9). That is, after the prohibition information 44 has been stored in the I/F memory 26, even if new AP connection information is received from the target terminal, the processor 25 does not provide the new AP connection information to the controller 30. Therefore, in the present embodiment, after the prohibition information has been stored in the I/F memory 26, the printer 10 can appropriately prevent the AP connection information registered in the AP information registration region 34b from being replaced with new AP connection information. Moreover, the action of not registering new AP connection information by not providing the new AP connection information to the controller 30 even if receiving the new AP connection information from the target terminal, due to the prohibition information 44 being stored in the I/F memory 26, can also be said to be prohibiting registration of the new AP connection information.

(Correspondence Relationship)

The Write command is an example of "first type of signal". S126 of FIG. 7 is an example of a process of "causing the interface memory to store prohibition information . . . ". The process in the case of YES in S132 of FIG. 9 is an example of processes of "receiving the first type of signal including the first access point information . . . ", and "receiving the first type of signal including the second access point information . . . ". S136 is an example of a process of "providing the first access point information in the second type of signal to the apparatus controller . . . ".

Specific examples of the technology disclosed in the present specification are described above in detail, but these examples are merely illustrative and place no limitation on the scope of the patent claims. The technology described in the patent claims also encompasses various changes and modifications to the specific examples described above. Modifications of the above embodiments are listed below.

Modification 1

In the embodiments described above, the processor 25 provides the AP connection information, which was received from the target terminal and stored temporarily in the buffer 27, to the controller 30 without causing the I/F memory 26 to store the AP connection information (see S18 of FIG. 2, S80 of FIG. 6, S136 of FIG. 9). The configuration is not limited to this, and the processor 25 may provide the AP connection information, which was received from the target terminal and stored temporarily in the buffer 27, to the controller 30 after having caused the I/F memory 26 to store the AP connection information.

Modification 2

In the embodiments described above, the CPU 32 provides the WFD connection information 40a and the belong NW information 42b (or 42c) to the NFC I/F 24, and causes the I/F memory 26 to store the WFD connection information 40a and the belong NW information 42b (or 42c) (see S34 of FIG. 3, S104 of FIG. 7). Upon receiving the Read command from the target terminal, the processor 25 sends the WFD connection information 40a and the belong NW information being stored in the I/F memory 26 to the target terminal (see S26 of FIG. 2, S88 of FIG. 6, S146 of FIG. 9). The configuration is not limited to this, and the CPU 32 may not provide the WFD connection information 40a and the belong NW information to the NFC I/F 24. That is, the WFD connection information 40a, etc. may not be caused to be stored in the I/F memory 26. In this case, upon receiving the Read command from the target terminal, the processor 25 may provide, to the controller 30, a predetermined notification indicating that the Read command has been received. Upon acquiring the predetermined notification from the NFC I/F 24, the CPU 32 may provide the WFD connection information 40a and the belong NW information in the main memory 34 to the NFC I/F 24. Upon acquiring the WFD connection information 40a, etc. from the controller 30, the processor 25 may send the acquired WFD connection information 40a, etc. to the target terminal. According to the present modification, the printer 10 can send the WFD connection information 40a, etc. to the target terminal without causing the I/F memory 26 to store the WFD connection information 40a, etc.

Modification 3

In the embodiments described above, when the wired I/F 20 is linked down, the CPU 32 deletes, from the I/F memory 26, the wired NW information 42c that is being stored in the I/F memory 26. The configuration is not limited to this and, even if the wired I/F 20 is linked down, the CPU 32 may not delete, from the I/F memory 26, the wired NW information 42c that is being stored in the I/F memory 26.

Modification 4

In the embodiments described above, when the CPU 32 establishes a Wi-Fi connection with the target AP, the CPU 32 receives the AP NW information from the target AP (see S50 of FIG. 3, S120 of FIG. 7). The CPU 32 registers the received AP NW information in the AP information registration region 34b (see S54 of FIG. 3, S124 of FIG. 7). Instead, the CPU 32 may not receive the AP NW information from the target AP. For example, the CPU 32 may use information (e.g., subnet mask, etc.) stored in advance in the main memory 34 as at least a part of the AP NW information.

Modification 5

In the embodiments described above, the communication system 2 has been described, as an example, that is provided with the printer 10 that is capable of performing the print function. The communication apparatus provided in the communication system is not limited to the printer, but may be a multi-function device capable of performing various functions such as print function, scanner function, copy function, FAX function, etc. Further, the communication apparatus may be a scanner capable of performing only the scanner function. These devices are also examples of "communication apparatus".

Modification 6

In the embodiments described above, in the case where the power of the printer 10 is turned ON, the CPU 32 prepares the WFD connection information and the WFD NW information, and registers the WFD connection information and the WFD NW information in the WFD information registration region 34a (S32 of FIG. 3, S102 of FIG. 7). Further, the CPU 32 stores the WFD connection information in the I/F memory (S34 of FIG. 3, S104 of FIG. 7). The configuration is not limited to this, and the CPU 32 may update the WFD connection information and the WFD NW information at each predetermined time interval. Further, the CPU 32 may update the WFD connection information and the WFD NW information each time the Wi-Fi connection in the WFD NW is disconnected. In these cases, the CPU 32 may register new WFD connection information and new WFD NW information in the WFD information registration region 34a each time the new WFD connection information and the new WFD NW information are prepared. Further, the CPU 32 may store the new WFD connection information in the I/F memory.

Modification 7

In the first embodiment described above, the NFC I/F 24 is a Type 4 NFC tag. Instead, in the first embodiment, a Type 3 NFC tag may be used as the NFC I/F 24. In that case, in a case where an NFC connection has been established with the target terminal, the processor 25 may monitor whether the Write command including the AP connection information is received from the target terminal, and whether the Read command is received from the target terminal.

Modification 8

In the embodiments described above, the NFC I/F 24 is an NFC tag. The configuration is not limited to this, and the NFC I/F 24 may be an NFC forum device. In that case, the NFC I/F 24 may operate in a state in which the CE mode is activated, and P2P mode and R/W mode are invalidated. The NFC I/F 24 of this modification is also an example of "first interface".

Modification 9

Further, the printer 10 and the portable terminals 80, 90 may, instead of the NFC I/F, be Bluetooth I/Fs for performing a wireless communication in accordance with the Bluetooth scheme (called "BT communication" below). The Bluetooth I/F of this modification is also an example of "first interface".

Modification 10

In the embodiments, the Write command including the AP connection information is not received from the target terminal in the case where the wired I/F 20 is linked up. The configuration is not limited to this, and the Write command including the AP connection information may be received from the target terminal in the case where the wired I/F 20 is linked up.

Modification 11

In the embodiments described above, each process in FIG. 2, FIG. 3, FIG. 6, FIG. 7, and FIG. 9 is implemented by software (i.e., program). However, at least one process of the processes in FIG. 2, FIG. 3, FIG. 6, FIG. 7, and FIG. 9 may be implemented by hardware such as a logic circuit.

Further, the technical elements explained in the present specification or drawings provide technical utility either independently or through various combinations. The present invention is not limited to the combinations described at the time the claims are filed. Further, the purpose of the technology illustrated by the present specification or drawings is to satisfy multiple objectives simultaneously, and satisfying any one of those objectives gives technical utility to the present invention.

What is claimed is:

1. A communication apparatus comprising:
a first interface configured to perform a wireless communication in accordance with a first communication scheme, the first interface comprising an interface controller;
a second interface configured to perform a wireless communication in accordance with a second communication scheme different from the first communication scheme;
an apparatus memory configured to register access point information, wherein the access point information indicates a specific access point to be used for establishing a wireless connection through the specific access point via the second interface; and an apparatus controller, wherein the interface controller or the apparatus controller performs determining whether the access point information is registered in the apparatus memory or not, the apparatus controller being configured to perform:
in a case where the first interface receives, from a first terminal device, a first type of signal related to registration of first access point information in the apparatus memory in a state where it is determined that the access point information is not registered in the apparatus memory:
(a) registering, in the apparatus memory, the first access point information related to the received first type of signal, wherein the first access point information indicates a first access point is to be used for establishing a wireless connection with the first access point;
(b) communicating with a first terminal device through the first access point via the second interface by establishing the wireless connection with the first access point using the first access point information;
(c) after establishing the wireless connection with the first access point using the first access point information, changing a setting for registering access point information in the apparatus memory from a permissible state, in which access point information is allowed to be registered in the apparatus memory, to a prohibition state, in which access point information is not allowed to be registered in the apparatus memory;
(d) after the first access point information has been registered in the apparatus memory and the setting for registering access point information has been changed to the prohibition state, receiving another first type of signal related to registration of second access point information in the apparatus memory from a second terminal device;
(e) maintaining the first access point information registered in the apparatus memory while not registering, in the apparatus memory, the second access point information related to the received other first type of signal related to the registration of the second access point information, wherein the second access point information indicates a second access point is to be used for establishing a wireless connection with the second access point; and
(f) communicating with the first terminal device through the first access point via the second interface by maintaining the wireless connection with the first access point using the first access point information after receiving the other first type of signal related to the registration of the second access point information.

2. The communication apparatus as in claim 1, wherein:
the interface controller is configured to perform:
receiving the first type of signal including the first access point information from the first terminal device in a state where the access point information is not registered in the apparatus memory;
providing the first access point information in the first type of signal to the apparatus controller in a case where the first type of signal is received from the first terminal device;
receiving the first type of signal including the second access point information from the second terminal device after the first access point information has been registered in the apparatus memory; and
providing the second access point information in the first type of signal to the apparatus controller in a case where the first type of signal is received from the second terminal device, the registration of the first access point information in the apparatus memory is performed in a case where the first access point information is provided from the first interface, and the maintaining of the first access point information registered in the apparatus memory while not registering in the apparatus memory the second access point information is performed in a case where the second access point information is provided from the first interface after the first access point information has been registered in the apparatus memory.

3. The communication apparatus as in claim 1, wherein:
the first interface comprises an interface memory,
the apparatus controller is further configured to cause the interface memory to store prohibition information for prohibiting provision of information from the first interface to the apparatus controller, in a case where the first access point information is registered in the apparatus memory, the registration of the first access point information in the apparatus memory is performed in a case where the prohibition information is not stored in the interface memory, and the maintaining of the first access point information that has been registered in the apparatus memory while not registering in the apparatus memory the second access point information is performed in a case where the prohibition information is stored in the interface memory.

4. The communication apparatus as in claim 3, wherein:
the interface controller is further configured to perform:
receiving the first type of signal which does not include the first access point information from the first terminal device before the prohibition information is stored in the interface memory;
sending a first response signal to the first terminal device in a case where the first type of signal is received from the first terminal device, the first response signal indicating that a process based on a second type of signal related to the registration of the first access point information in the apparatus memory including the first access point information can be executed;
receiving the second type of signal which includes the first access point information from the first terminal device, in response to sending the first response signal to the first terminal device;
providing the first access point information in the second type of signal to the apparatus controller, in a case where the second type of signal is received from the first terminal device;
receiving the first type of signal which does not include the second access point information from the second terminal device, after the prohibition information has been stored in the interface memory; and
sending a second response signal to the second terminal device in a case where the first type of signal is received from the second terminal device, the second response signal indicating that the process based on the second type of signal including the second access point information cannot be executed, and the registration of the first access point information in the apparatus memory is performed in a case where the first access point information is provided from the first interface.

5. The communication apparatus as in claim 3, wherein:
the interface controller is further configured to perform:
  receiving the first type of signal which includes the first access point information from the first terminal device before the prohibition information is stored in the interface memory;
  providing the first access point information in the first type of signal to the apparatus controller in a case where the first type of signal is received from the first terminal device; and
  receiving the first type of signal which includes the second access point information from the second terminal device after the prohibition information has been stored in the interface memory,
even in a case where the first type of signal is received from the second terminal device, the second access point information in the first type of signal is not provided to the apparatus controller, and
the registration of the first access point information in the apparatus memory is performed in a case where the first access point information is provided from the first interface.

6. The communication apparatus as in claim 1, wherein:
the first interface comprises an interface controller,
the apparatus memory is further configured to register parent station information, wherein the parent station information indicates that the communication apparatus operates as a parent station and is to be used for establishing a wireless connection, with the communication apparatus operating as the parent station of a wireless network via the second interface, without going through the specific access point,
the apparatus controller is further configured to cause the apparatus memory to store the parent station information, and
the interface controller is configured to perform:
  receiving, from a third terminal device, a third type of signal related to reading out of the parent station information in the communication apparatus; and
  sending the parent station information to the third terminal device in a case where the third type of signal is received from the third terminal device after the parent station information has been stored in the apparatus memory.

7. The communication apparatus as in claim 6, wherein:
the first interface further comprises an interface memory,
the apparatus controller is further configured to cause the interface memory to store the parent station information, and
the sending of the parent station information includes reading out the parent station information from the interface memory and sending the parent station information to the third terminal device, in a case where the third type of signal is received from the third terminal device after the parent station information has been stored in the interface memory.

8. The communication apparatus as in claim 7, wherein:
the apparatus controller is further configured to perform:
  establishing a wireless connection with the first access point via the second interface by using the first access point information; and
  causing the interface memory to store wireless communication information for performing a wireless communication with the communication apparatus via the specific access point with which the wireless connection is established, and
the sending of the parent station information includes reading out both of the parent station information and the wireless communication information from the interface memory and sending both of the parent station information and the wireless communication information to the third terminal device, in a case where the third type of signal is received from the third terminal device after both of the parent station information and the wireless communication information have been stored in the interface memory.

9. The communication apparatus as in claim 1, wherein:
the first interface comprises an interface memory,
the interface memory comprises a first interface memory for storing information to be sent to an external apparatus and a second interface memory for storing information to be received from the external apparatus, and
the interface controller is configured to provide the first access point information which is received from the first terminal device and stored in the second interface memory, to the apparatus controller, without causing the first interface memory to store the first access point information.

10. The communication apparatus as in claim 1, wherein:
the first interface comprises an interface memory,
the interface memory comprises a first interface memory for storing information to be sent to an external apparatus and a second interface memory for storing information to be received from the external apparatus,
the apparatus controller is further configured to perform causing the first interface memory to store parent station information, wherein the parent station information indicates that the communication apparatus operates as a parent station and is to be used for establishing a wireless connection, with the communication apparatus operating as the parent station of a wireless network, without going through the specific access point, and
the interface controller is configured to perform:
  receiving, from a third terminal device, a third type of signal related to reading out of the parent station information in the first interface memory;
  reading out the parent station information from the first interface memory and sending the parent station information to the third terminal device, in a case where a specific type of signal related to reading out of the parent station information in the communication apparatus is received from the third terminal device after the parent station information has been stored in the first interface memory; and
  providing the first access point information, which is received from the first terminal device and stored in the second interface memory, to the apparatus controller, without causing the first interface memory to store the first access point information.

11. The communication apparatus as in claim 1, further comprising:
a third interface configured to perform a wired communication,
wherein the registration of the first access point information in the apparatus memory is performed, in a case where the first interface receives the first type of signal from the first terminal device in a state where the access point information is not registered in the apparatus memory and the third interface is not linked up, and wherein the registration of the first access point information in the apparatus memory is not performed, in a case where the first interface receives the first type of signal from the first terminal device in a state where the access point information is not registered in the apparatus memory and the third interface is linked up.

12. The communication apparatus as in claim 1, wherein:
the first communication scheme is an NFC (abbreviation of Near Field Communication) scheme in accordance with an NFC standard, and
the first interface is an NFC tag of the NFC standard.

13. The communication apparatus as in claim 1, the apparatus controller being further configured to perform:
after changing the setting for registering access point information in the apparatus memory from the permissible state to the prohibition state, receiving an instruction for image formation on a recording medium through the wireless connection using the second interface,
wherein the other first type of signal related to registration of the second access point information in the apparatus memory is received from the second terminal device after receiving the instruction the image formation.

14. A non-transitory computer-readable medium storing computer-readable instructions for a communication apparatus, wherein:
the communication apparatus comprises:
a first interface configured to perform a wireless communication in accordance with a first communication scheme, the first interface comprising an interface controller;
a second interface configured to perform a wireless communication in accordance with a second communication scheme different from the first communication scheme;
an apparatus memory configured to register access point information, wherein the access point information indicates that a specific access point is to be used for establishing a wireless connection through the specific access point via the second interface; and
an apparatus controller, wherein the interface controller or the apparatus controller performs determining whether the access point information is registered in the apparatus memory or not, and
the computer-readable instructions, when executed by the apparatus controller, cause the communication apparatus to perform:
in a case where the first interface receives, from a first terminal device, a first type of signal related to registration of first access point information in the apparatus memory in a state where it is determined that the access point information is not registered in the apparatus memory:
(a) registering, in the apparatus memory, the first access point information related to the received first type of signal, wherein the first access point information indicates a first access point is to be used for establishing a wireless connection with the first access point; and
(b) communication with a first terminal device through the first access point via the second interface by establishing the wireless connection with the first access point using the first access point information;
(c) after establishing the wireless connection with the first access point using the first access point information, changing a setting for registering access point information in the apparatus memory from a permissible state, in which access point information is allowed to be registered in the apparatus memory, to a prohibition state, in which access point information is not allowed to be registered in the apparatus memory;
(d) after the first access point information has been registered in the apparatus memory and the setting for registering access point information has been changed to the prohibition state, receiving another first type of signal related to registration of second access point information in the apparatus memory from a second terminal device;
(e) maintaining the first access point information registered in the apparatus memory while not registering, in the apparatus memory, the second access point information related to the received other first type of signal related to the registration of the second access point information, wherein the second access point information indicates that a second access point is to be used for establishing a wireless connection with the second access point; and
(f) communicating with the first terminal device through the first access point via the second interface by maintaining the wireless connection with the first access point using the first access point information after receiving the other first type of signal related to the registration of the second access point information.

15. A method performed by an apparatus controller of a communication apparatus, wherein:
the communication apparatus comprises:
a first interface configured to perform a wireless communication in accordance with a first communication scheme, the first interface comprising an interface controller;
a second interface configured to perform a wireless communication in accordance with a second communication scheme different from the first communication scheme;
an apparatus memory configured to register access point information, wherein the access point information indicates a specific access point is to be used for establishing a wireless connection through the specific access point via the second interface; and
an apparatus controller, wherein the interface controller or the apparatus controller performs determining whether the access point information is registered in the apparatus memory or not, and
the method comprises:
in a case where the first interface receives, from a first terminal device, a first type of signal related to registration of first access point information in the apparatus memory in a state where it is determined that the first access point information is not registered in the apparatus memory:
(a) registering, in the apparatus memory, the first access point information related to the received first type of signal, wherein the first access point information indicates that a first access point is to be used for establishing a wireless connection with the first access point; and
(b) communication with a first terminal device through the first access point via the second interface by establishing the wireless connection with the first access point using the first access point information;

(c) after establishing the wireless connection with the first access point using the first access point information, changing a setting for registering access point information in the apparatus memory from a permissible state, in which access point information is allowed to be registered in the apparatus memory, to a prohibition state, in which access point information is not allowed to be registered in the apparatus memory;

(d) after the first access point information has been registered in the apparatus memory and the setting for registering access point information has been changed to the prohibition state, receiving another first type of signal related to registration of second access point information in the apparatus memory from a second terminal device;

(e) maintaining the first access point information registered in the apparatus memory while not registering, in the apparatus memory, the second access point information related to the received other first type of signal related to the registration of the second access point information, wherein the second access point information indicates a second access point is to be used for establishing a wireless connection with the second access point; and (f) communicating with the first terminal device through the first access point via the second interface by maintaining the wireless connection with the first access point using the first access point information after receiving the other first type of signal related to the registration of the second access point information.

* * * * *